(12) United States Patent
Wu et al.

(10) Patent No.: US 9,081,117 B2
(45) Date of Patent: Jul. 14, 2015

(54) METHOD AND APPARATUS FOR PREDICTING PETROPHYSICAL PROPERTIES FROM NMR DATA IN CARBONATE ROCKS

(75) Inventors: Jianghui Wu, Sugar Land, TX (US); Songhua Chen, Katy, TX (US); Bo Gao, Austin, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 759 days.

(21) Appl. No.: 13/232,416

(22) Filed: Sep. 14, 2011

(65) Prior Publication Data

US 2012/0065888 A1    Mar. 15, 2012

Related U.S. Application Data

(60) Provisional application No. 61/383,216, filed on Sep. 15, 2010.

(51) Int. Cl.
  *G01V 1/00* (2006.01)
  *G01V 3/32* (2006.01)

(52) U.S. Cl.
  CPC ...................................... *G01V 3/32* (2013.01)

(58) Field of Classification Search
  CPC ....... G01V 5/101; G01V 5/104; G01V 5/107; G01V 3/32; G01V 11/00; G01N 24/081; G01R 33/305; G01R 33/448
  See application file for complete search history.

(56) References Cited

U.S. PATENT DOCUMENTS

| | | |
|---|---|---|
| 6,215,304 B1 | 4/2001 | Slade |
| 6,774,628 B2 * | 8/2004 | Ganesan ....................... 324/303 |
| 6,792,354 B1 | 9/2004 | O'Meara, Jr. |
| 6,977,499 B2 | 12/2005 | Kiesl et al. |
| 7,091,719 B2 | 8/2006 | Freedman |
| 7,309,983 B2 | 12/2007 | Freedman |

OTHER PUBLICATIONS

R. Freedman, "New Approach for Solving Inverse Problems Encountered in Well-Logging and Geophysical Applications," Petrophysics, vol. 47, No. 2, pp. 93-111 (Apr. 2006).

* cited by examiner

*Primary Examiner* — Elias Desta
(74) *Attorney, Agent, or Firm* — Mossman Kumar & Tyler PC

(57) ABSTRACT

An apparatus and method for determining a property of an earth formation using a radial basis function derived from a catalog of rock samples. Parameters of a Thomeer capillary pressure fitting curve are derived and used for analyzing rocks with unimodal or multimodal pore size distributions.

21 Claims, 14 Drawing Sheets

METHOD AND APPARATUS FOR PREDICTING PETROPHYSICAL PROPERTIES FROM NMR DATA IN CARBONATE ROCKS

CROSS-REFERENCES TO RELATED APPLICATIONS

This application claims priority from U.S. Provisional patent application Ser. No. 61/383,216 filed on Sep. 15, 2010, incorporated herein by reference in its entirety.

BACKGROUND OF THE DISCLOSURE

1. Field of the Disclosure

This disclosure is related to methods for acquiring and processing nuclear magnetic resonance (NMR) measurements for determination of capillary pressure curves in carbonate formations with complex pore systems.

2. Description of the Related Art

More than 50% of the world's hydrocarbon reserves are in carbonate reservoirs. Whereas NMR applications for evaluating siliciclastic sandstone reservoirs are successful, the application of NMR for carbonate rock characterization has always been challenging. Carbonates are characterized by different pore types and complex pore-size distributions. Because of their reactive nature, carbonates undergo a more complicated post-depositional diagenesis compared to siliciclastic sandstones. The diagenesis process includes, among others, cementation, dissolution, dolomitization, recrystallization, and evaporate mineralization. Carbonates are also sensitive to the microorganism activity in their depositional environment. As a result, NMR response to some of these pore typing variations is more complicated rendering prediction of reservoir quality of carbonate rocks a big challenge.

The primary pores in carbonate sediments show a considerably more varied microgeometry than in siliciclastic sediments. Additionally, and in contrast to most siliciclastic rocks, during diagenesis the primary porosity is significantly changed. The predictability of petrophysical properties of carbonate rocks is mainly hampered by this great variability of the connectivity of different pore types. For instance, unconnected, ineffective moldic pores lead to low permeability at a given porosity value, whereas intercrystalline pores in sucrosic dolomite rocks usually show high permeability at the same given porosity. The ability to determine the types of porosity present in a porous rock is vital for reliable prediction of reservoir quality (Lucia, 1995).

Distribution of the pore throats is an important characteristics of a reservoir rock because it determines the magnitude of capillary pressures in a rock and thus (among other things) the saturation-height profile. Formation evaluation methods require measurements of both a pore-throat distribution (capillary pressure curves) and a pore-size distribution (from NMR) of a rock. Among those, at present only NMR measurement can be performed in-situ in a borehole by a logging tool. The rest have to be conducted in laboratory on core samples, and have either a limited range, or are destructive. Developing a reliable method to convert NMR measurements to 1st drainage capillary pressure curves lifts these limitations, and provides a continuous reading of capillary pressure curves with depth.

U.S. Pat. No. 6,977,499 to Kiesl et al., having the same assignee as the present disclosure and the contents of which are incorporated herein by reference, discloses a method of using a nuclear magnetic resonance (NMR) sensor assembly conveyed in a borehole in an earth formation including a carbonate wherein a carbonate classification scheme is used for defining the processing scheme used for processing of the NMR spin echo signals. Parameters of interest such as total porosity, bound volume irreducible (BVI), bound water moveable (BVM), a distribution of transverse relaxation times and/or a distribution of longitudinal relaxation times may be obtained. As in the teachings of Kiesl, samples from the Carbonate NMR Rock Catalog by ART are used, along with other rock databases. It should be noted that while the method of the present disclosure has been illustrated using carbonates as an example, this is not to be construed as a limitation and the method may also be used with siliciclastic rocks.

One embodiment of the disclosure is a method of estimating a value of a property of an earth formation. The method includes: using a nuclear magnetic resonance (NMR) sensor assembly conveyed in a borehole in the earth formation and obtaining nuclear magnetic resonance (NMR) spin-echo signals indicative of the property of the earth formation; processing the spin-echo signals using a radial basis function derived using (i) a database comprising a plurality of samples, and (ii) an NMR measurement associated with each sample in the database and related to the spin echo signals; for estimating the value of the property.

Another embodiment of the disclosure is an apparatus configured to estimate a value of a property of an earth formation. The apparatus includes: a nuclear magnetic resonance (NMR) sensor assembly configured to be conveyed in a borehole in the earth formation and obtain nuclear magnetic resonance (NMR) spin-echo signals indicative of the property of the earth formation; and a processor configured to process the spin-echo signals using a radial basis function derived using (i) a database comprising a plurality of samples, and (ii) an NMR measurement associated with each sample in the database and related to the spin echo signals; for estimating the value of the property.

Another embodiment of the disclosure is a computer-readable medium having thereon instructions that when read by a processor cause the processor to execute a method. The method includes: processing spin-echo signals obtained by a nuclear magnetic resonance (NMR) sensor assembly conveyed in a borehole in the earth using a radial basis function derived using (i) a database comprising a plurality of samples, and (ii) an NMR measurement associated with each sample in the database and related to the Spin echo signals; for estimating the value of the property.

BRIEF DESCRIPTION OF THE DRAWINGS

The present disclosure is best understood with reference to the following figures in which like numbers refer to like elements.

DETAILED DESCRIPTION OF THE DISCLOSURE

Figure 1:
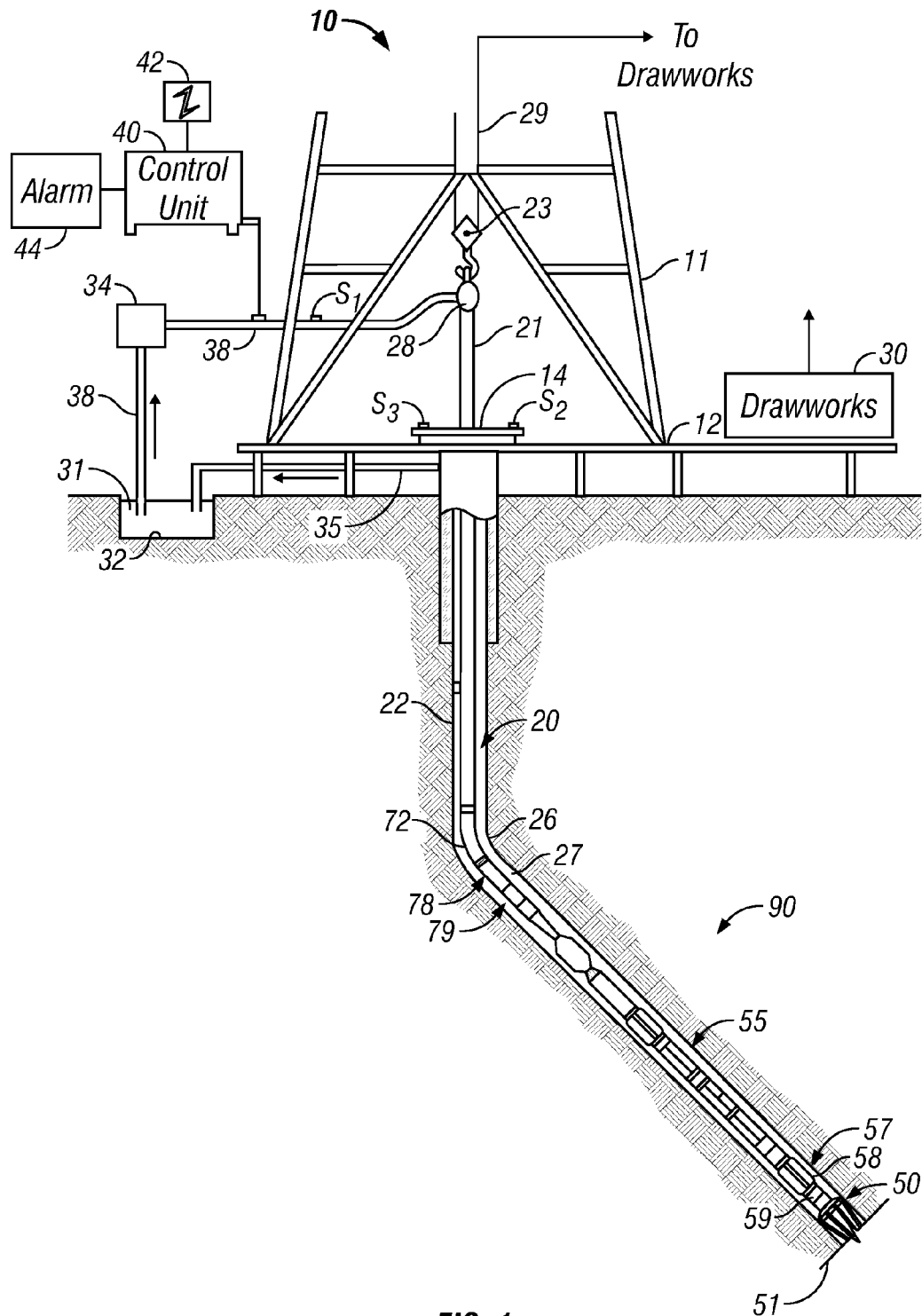
FIG. 1 shows a measurement-while-drilling tool suitable for use with the present disclosure.

FIG. 1 shows a schematic diagram of a drilling system 10 with a drillstring 20 carrying a drilling assembly 90 (also referred to as the bottomhole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein. During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the disclosure, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

A suitable device for use of the present disclosure is disclosed in U.S. Pat. No. 6,215,304 to Slade, the contents of which are fully incorporated herein by reference. It should be noted that the device taught by Slade is for exemplary purposes only, and the method of the present disclosure may be used with many other NMR logging devices, and may be used for wireline as well as MWD applications.

Figure 2:
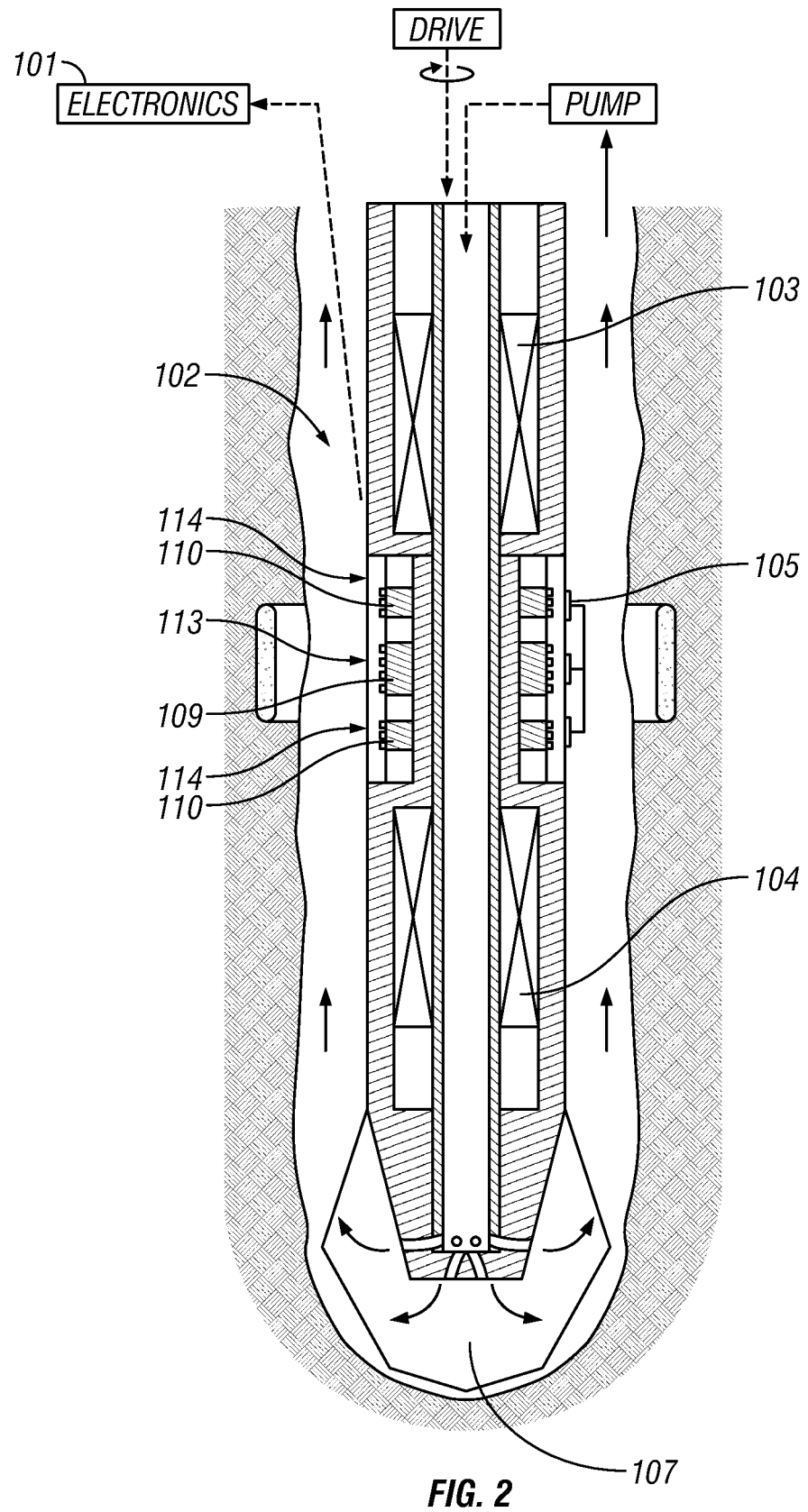
FIG. 2 shows a sensor section of a measurement-while-drilling device suitable for use with the present disclosure.

Referring now to FIG. 2, the tool has a drill bit 107 at one end, a sensor section 102 behind the drill head, and electronics 101. The sensor section 102 comprises a magnetic field generating assembly for generating a $B_0$ magnetic field (which is substantially time invariant over the duration of a measurement), and an RF system for transmitting and receiving RF magnetic pulses and echoes. The magnetic field generating assembly comprises a pair of axially spaced main magnets 103, 104 having opposed pole orientations (i.e. with like magnetic poles facing each other), and three ferrite members 109, 110 axially arranged between the magnets 103, 104. The ferrite members are made of "soft" ferrite which can be distinguished over "hard" ferrite by the shape of the BH curve which affects both intrinsic coercivity ($H_j$ the intersection with the H axis) and initial permeability ($\mu_i$, the gradient of the BH curve in the unmagnetized case). Soft ferrite values typically range from 10 to 10000 whereas hard ferrite has $\mu_i$, of about 1. Therefore the soft ferrite has large initial permeability (typically greater than 10, and could be greater than 1000). The RF system comprises a set of RF transmit antenna and RF receive antenna coil windings 105 arranged as a central "field forming" solenoid group 113 and a pair of outer "coupling control" solenoid groups 114.

As would be known to those versed in the art, NMR signals are obtained by polarizing nuclear spins in the earth formation and pulsing the nuclei with a Radio Frequency (RF) magnetic field using pulse sequences such as the CPMG sequence (in which the spins are first tipped using a 90° tipping pulse followed by a series of 180° refocusing pulses), or by an Optimized Refocusing Pulse Sequence (ORPS) in which the tipping pulse is less than 90° and the refocusing pulses are less than 180°. The spin echo signals obtained in this method may be inverted to a $T_2$ distribution (distribution of a transverse relaxation time $T_2$). Prior art methods of converting NMR measurements (e.g. spin-echo train or $T_2$ distribution) to capillary pressure ($P_c$) utilize a single scaling factor to match $T_2$ and $P_c$ curves. This method has been used for analyzing siliciclastic rocks. For carbonates with complex pore systems, e.g. systems with multimode pore size distributions and thus multimode capillary pressure curves, this method cannot provide reliable conversions. The estimation of formation properties such as $P_c$ from NMR measurements is an example of an inverse problem in well logging.

Figure 3:
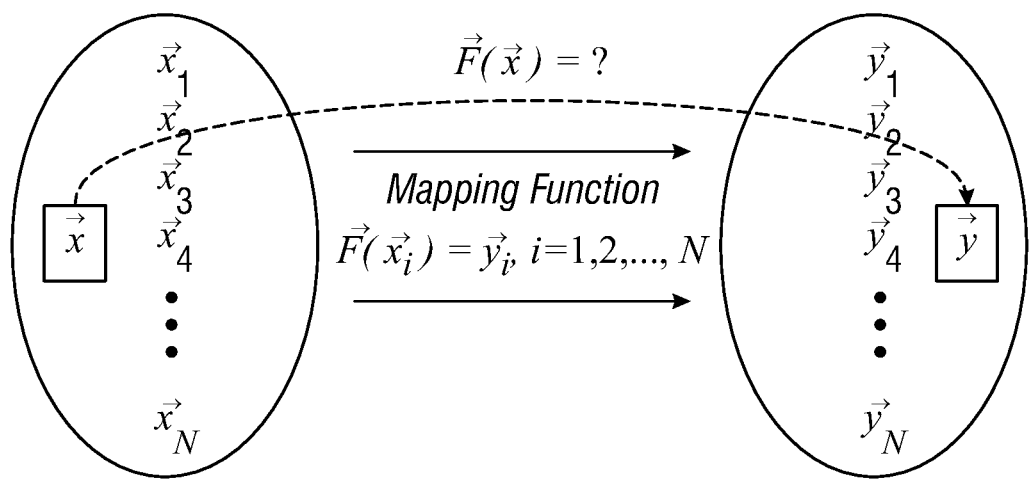
FIG. 3 illustrates the concept of a Radial Basis Function (RBF)

Inverse problems encountered in well logging and geophysical applications may involve predicting the physical properties of some underlying system given a set of measurements. Consider a database (illustrated in FIG. 3) having a set of distinct input data $\vec{x}_i \in R^n$ (i.e., the inputs are n-dimensional vectors) and a set of corresponding real outputs, $\vec{y}_i \in R^m$, for i=1, ..., N, where N is the number of cases in the database. The different cases in the database represent different states of the underlying physical system. In the mathematical language, $\vec{y}_i$ values represent samples of the function that one wants to approximate, and $\vec{x}_i$ values are the distinct points at which the function is given. The database inputs, $\vec{x}_i$, represent the measurements from which one would like to predict the physical properties of the underlying system. The database outputs, $\vec{y}_i$, are the physical properties we want to predict from the measurements. The database is used to construct a mapping function such that, given measurements $\vec{x}$ that are not in the database, one can predict the properties $\vec{F}(\vec{x})$ of the physical system that is consistent with the measurements. The mapping function solves the inverse problem by predicting the physical properties of the system from the measurements.

Radial basis function (RBF) interpolation is a mathematical method for approximating smooth and continuous multivariate functions of many variables (Powell, 2001). RBF interpolation is used to derive a non-linear mapping function from which the unknown properties of physical systems are predicted from input measurements that are not in the original database. An advantage of this method over the traditional approach of fitting data to a forward model is that it can be used to solve well-logging and geophysical inverse problems associated with unknown forward models. In other cases where accurate forward models are known, the method can be used to solve inverse problems in real time, where these might otherwise be computationally too expensive or, as in many practical cases, lead to ill-behaved non-linear optimization.

In the present disclosure, a similar radial basis function approach is used for estimating rock properties from NMR logs. The method of the present disclosure can be extended for obtaining rock and reservoir properties by inversion of well-logging and geophysical measurements from any type of sensor (e.g., electromagnetic, acoustic, nuclear, mechanical, electromechanical, or thermal) or combination of sensors.

RBF interpolation chooses an approximating or mapping function of the form $$\vec{F}(\vec{x}) = \sum_{i=1}^{N} \vec{c}_i \varphi(\|\vec{x} - \vec{x}_i\|) \quad (1)$$

The non-linear function, $\phi$, is known as an RBF. The argument of the RBF depends on the Euclidean norm in n-dimensional space; i.e., $$\|\vec{x} - \vec{x}_i\| = \sqrt{\sum_{m=1}^{n} (x_m - x_{i,m})^2} \quad (2)$$

The functions are called "radial" because they depend only on the distance, not the direction, of $\vec{x}_i$ from an arbitrary input vector, $\vec{x}$, at which the function is to be evaluated.

The real coefficients $\vec{c}_i$ are determined by requiring that the interpolation equations be satisfied exactly. Therefore, the coefficients are a linear combination of the given function values, $$\vec{c}_i = \sum_{j=1}^{N} \Phi_{i,j}^{-1} \vec{y}_j \quad (3)$$

where $\Phi_{i,j} \equiv \phi(\|\vec{x}_i - \vec{x}_j\|)$ is the N×N interpolation matrix.

Next, the database construction in the context of current problem is explained: to predict the capillary pressure curves from NMR measurements. For wetting fluid saturated rocks, NMR relaxation time distribution correlates with pore size distribution from which capillary pressure curves can be derived. However, the traditional method can have large errors when applied to complex carbonate rocks. RBF interpolation can be used to make more accurate predictions. The database is constructed by acquiring NMR measurements on a suite of N carbonate samples over a representative range of lithology, porosity and permeability, and/or other rock petrophysical attributes. The inputs to the database would be, for each carbonate sample, a vector whose elements are the NMR data (e.g., spin-echo train data, or $T_2$ distribution) for that sample. The data base outputs are the parameters that could be used to reconstruct corresponding capillary pressure curves. The parameterization of capillary pressure curves is another key part of current method and will be discussed in more detail in a subsequent section. In one embodiment, the database outputs are numerical values obtained by Thomeer (1960) hyperbola type curve match on mercury injection capillary pressure (MICP) data for each carbonate sample. Using this database, a radial basis mapping function can be constructed so that capillary pressure curve can be predicted from NMR measurements.

RBF interpolation method deals with real data. It is therefore of importance to be able to characterize a capillary pressure curve using as few meaningful numerical numbers as possible. The Brooks-Corey Model, the Two Parameter Model, and the Thomeer Model are commonly used in the industry for capillary pressure characterization. All of these equations have a similar trend. First, they approach infinity as the wetting-phase saturation approaches what is commonly referred to as the irreducible water saturation, $S_{wir}$. In addition, they all have a slope near zero as they approach a wetting phase saturation of unity.

Figure 4:
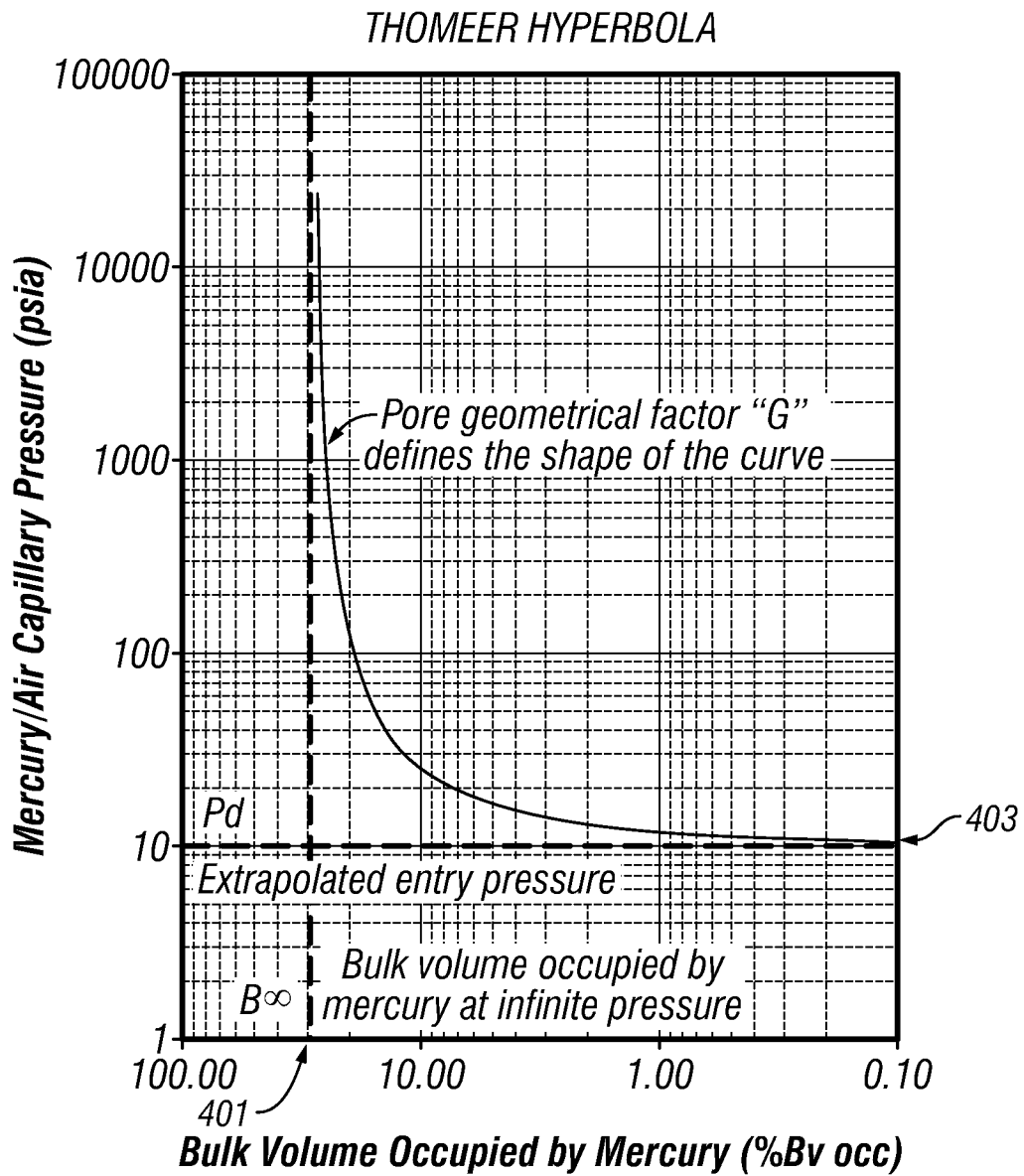
FIG. 4 shows a Thomeer Hyperbola determined by three parameters.

The Thomeer model is used in the capillary pressure curve parameterization for the reason that it delivers meaningful and intuitive parameters that can be used to quantify complex pore systems in carbonate rocks. This method was developed by Thomeer (1960) for the analysis of MICP data. The idea is based on the observation that the data from the MICP experiment, for simple rock types, could be represented by a hyperbola when plotted on Log-Log scale. The data are: (1) volume of mercury injected, and (2) applied pressure between the wetting (air) and non-wetting phases (mercury) as mercury intrudes into the pore space fraction. For the rock sample, the bulk volume is known, so that the volume of mercury injected can be re-expressed as a fraction of the total sample bulk volume, $B_V$. To fit the hyperbola to the data, the value of two asymptotes, $B^\infty$, $P_d$, are required. The Thomeer Hyperbola is shown in FIG. 4, and can be expressed as:

$$\text{Log}(B_V/B^\infty) \times \text{Log}(P_c/P_d) = K \quad (4)$$

where K is a hyperbola shape factor.

The asymptotes are: $B^\infty$ 401 is the percent bulk volume occupied by mercury at infinite applied pressure and $P_d$ 403, the capillary entry pressure required to first intrude mercury into the largest pore-throat. Thomeer chose to express constant K=Log [exp(−G)] such that the equation (4) becomes:

$$B_V/B^\infty = \exp[-G/\text{Log}(P_c/P_d)] \quad (5)$$

where G is the pore geometrical factor and determines the shape of the hyperbola. In practice, $B_V$ and $P_c$ data from the MICP experiment are fit by equation (5) to determine $P_d$, $B^\infty$, and G, for individual samples.

A single pore system can be represented by one Thomeer Hyperbola and is characterized by three parameters: $P_d$, $B^\infty$, and G, each of which has measurable errors to characterize uncertainty. The Thomeer parameters are intuitive: The maximum size of pore-throats characterized by the entry pressure, the sorting parameter of the pore-throats characterizes the shape of the hyperbola, and the maximum movable fluid volume fraction. They describe the pore system in a similar manner to grain system: i.e. largest grains to largest pore-throats, sorting of grains, and sorting of pore-throats (G). Petrophysical Rock Type (PRT) can be defined as an object in the Thomeer parameter space ($P_d$, $B^\infty$, and G), i.e. a similar pore system. The parameters for PRTs can be operated on statistically (mean and standard deviation) to create average capillary pressure curves and their error bounds. Estimates of recoverable hydrocarbon can be guided by the knowledge of a complex composite pore system and hence by PRT.

Thomeer Hyperbolas parameterize the process of filling the pore space with mercury (non-wetting phase) while displacing air (wetting phase), a drainage process. Suitable adjustments can be made to convert this behavior to other fluid systems in drainage (oil-water, gas-water). Thomeer Hyperbolas can be combined or superposed to quantify complex pore systems. Superposition can be used to quantify porosity types and entry pressures, i.e. microporosity. For current application, two to three Thomeer Hyperbolas might be superimposed on each other to mimic the multimodality in complex carbonate rocks. As a result, up to nine parameters ($P_{d1}$, $B_1^\infty$, $G_1$; $P_{d2}$, $B_2^\infty$, $G_2$; $P_{d3}$, $B_3^\infty$, $G_3$) can be used to characterize one capillary pressure curve from one set of MICP measurement. General guidelines for Thomeer Hyperbola type curve match are summarized here:

Fit the data using the least number of pore systems possible

The signal of bi/tri-modality can be: an obvious kink in the data, or major mismatch of the BV (total) unimodal against the measured porosity, BV total should be comparable to helium porosity within +/−2 p.u.

Knowledge of porosity types and entry pressures is useful in estimating the potential recoverable reserves in a reservoir and in developmental drilling. These are examples of developmental operations that can be carried out having knowledge of the capillary pressure curve.

The prediction of capillary pressure parameters from NMR measurements using radial basis function interpolation can be viewed as constructing the non-linear mapping from a vector input (e.g. $T_2$ amplitudes and relaxation times) to a vector output (CPCs: $P_{d1}$, $B_1^\infty$, $G_1$; $P_{d2}$, $B_2^\infty$, $G_2$; $P_{d3}$, $B_3^\infty$, $G_3$) given a suite of input-output pairs.

For current problem, consider a database of N input-output pairs whose inputs for each carbonate sample include $T_2$ distribution (among other possibilities, e.g. spin-echo train data), and corresponding output CPCs ($P_{d1}$, $B_1^\infty$, $G_1$; $P_{d2}$, $B_2^\infty$, $G_2$; $P_{d3}$, $B_3^\infty$, $G_3$). The CPCs for a carbonate rock sample not in the database can be predicted using the equation, $$CPCs = \frac{\sum_{i=1}^{N} \vec{c}_i \exp\left(-\frac{\|\vec{A} - \vec{A}_i\|^2}{2s_{Ai}^2}\right) \exp\left(-\frac{\|\vec{T}_2 - \vec{T}_{2i}\|^2}{2s_{Ti}^2}\right)}{\sum_{j=1}^{N} \exp\left(-\frac{\|\vec{A} - \vec{A}_j\|^2}{2s_{Aj}^2}\right) \exp\left(-\frac{\|\vec{T}_2 - \vec{T}_{2j}\|^2}{2s_{Tj}^2}\right)} \quad (6)$$

The CPCs of a carbonate rock sample can be predicted using equation (6) and the measured inputs: $T_2$ distribution amplitudes ($\vec{A}$), $T_2$ relaxation times ($\vec{T}_2$). A logging tool equipped with an NMR sensor could provide the measurements needed to predict CPCs. The accuracy of the predictions made by equation (6) relies heavily on constructing a database with a well-paved input space of carbonate sample measurements.

Figure 5A:
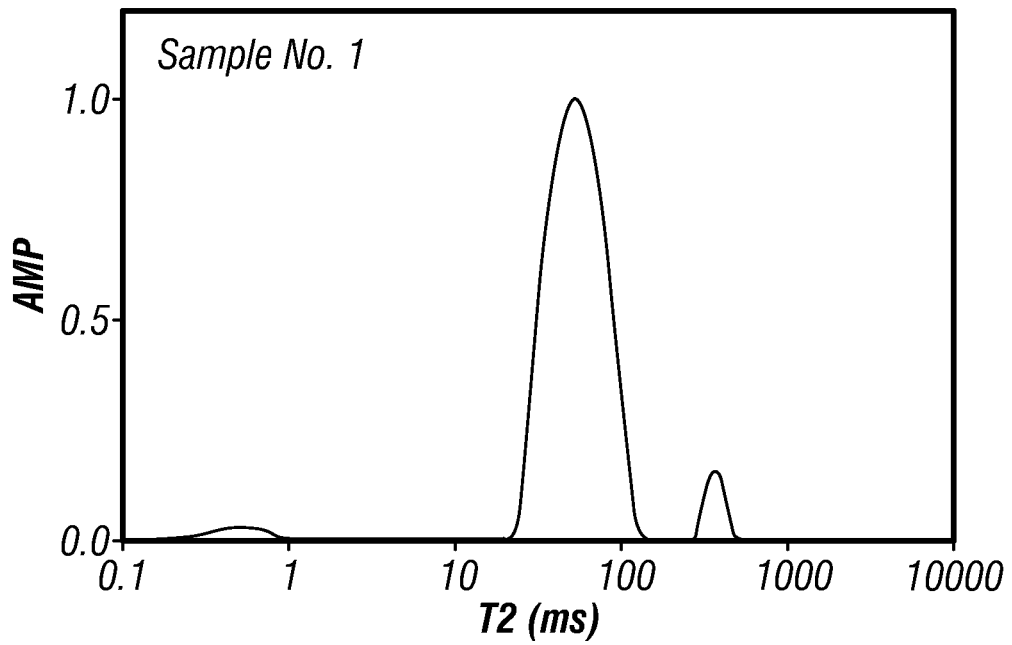
FIGS. 5a, 5b show two exemplary unimodal $T_2$ distributions for chalk samples.
Figure 5B:
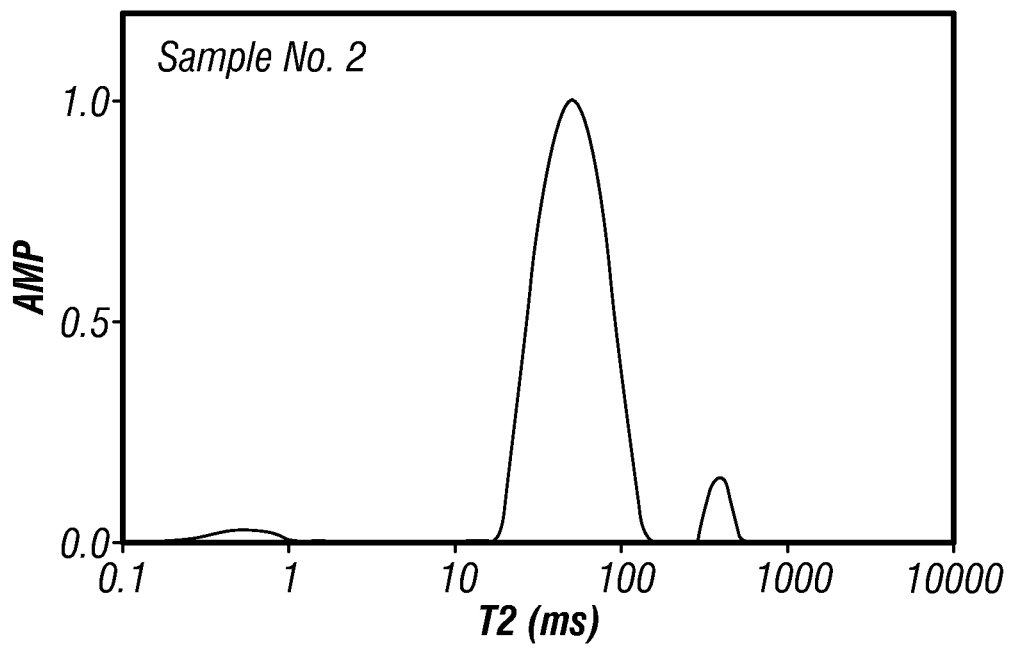

As a validation study, CPC prediction using eqn. (6) was tested using a small database of $T_2$ distributions and corresponding matched CPCs acquired on a suite of 15 chalk samples in the ART catalogue. The matched CPCs from Thomeer type curve are shown in Table 1. Measured $T_2$ distributions for samples 1 and 2 are shown in FIG. 5. The abscissa is the transverse relaxation time and the ordinate is amplitude. Note that all samples show unimodal capillary pressure behavior (only one set of $P_d$, $B^\infty$ and G).

Thomeer Hyperbola match. This is especially impressive considering the small size of the database.

Figure 6:
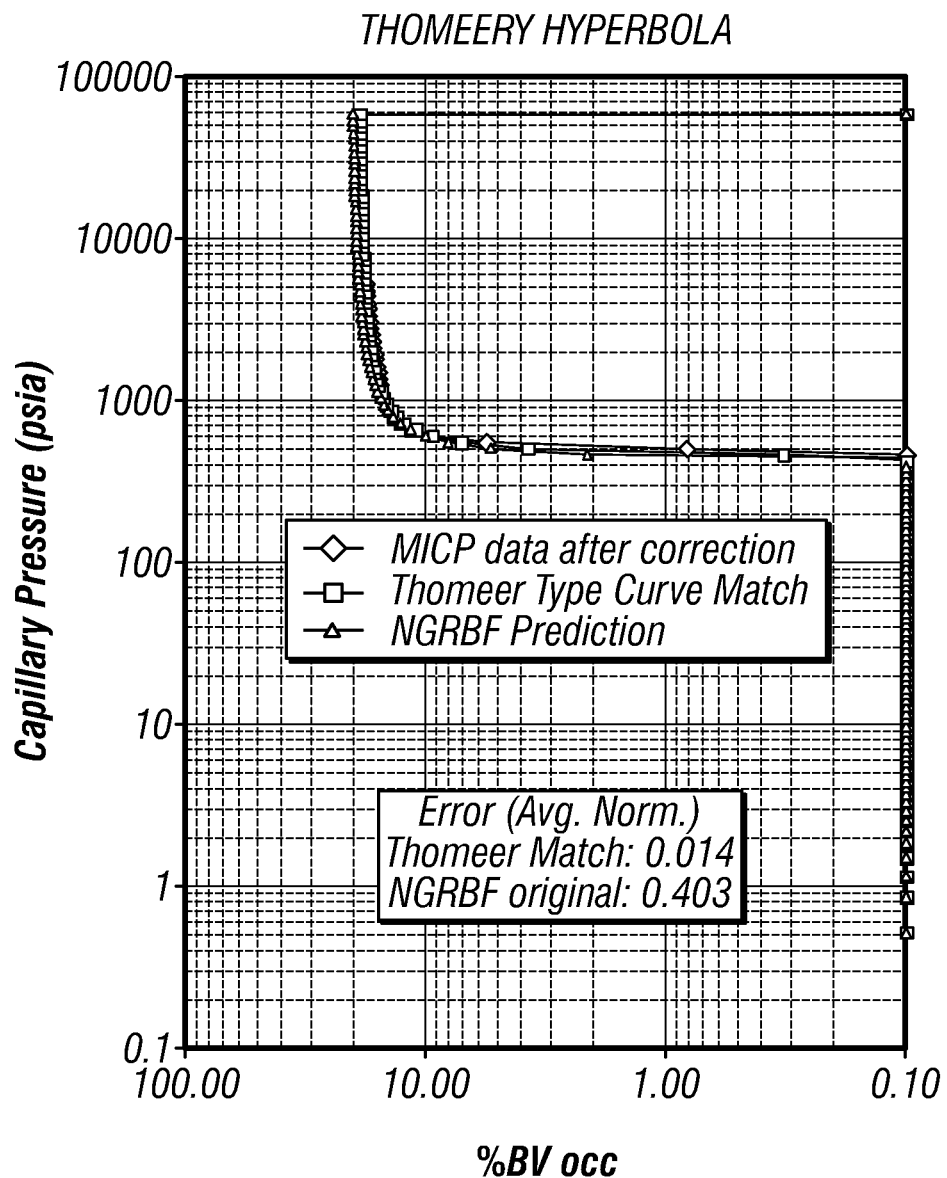
FIG. 6 shows Thomeer Hyperbola prediction for chalk samples.

The predicted CPCs were obtained by choosing $s_j=0.149$ for j=1, 2, . . . , N. This heuristic choice for the widths provided a good match and was based on the nearest neighbor distance. One typical match (Sample No. 10) is shown in FIG. 6. As can be seen, the corrected MICP data, the Thomeer Type curve match and the normalized Gaussian RBF prediction agree very closely.

With satisfactory validation results, the method can now be applied to more complex carbonate systems. Bimodal pore-size distributions were observed on two rock types in the ART catalogue, namely Diagenetic Chalk (DC) and Oolitic Dolomite (OD). Results for Diagenetic Chalk samples are shown here. Similar bimodal distributions were obtained for Oolitic Dolomite. The matched CPCs for DC samples from Thomeer

TABLE 1

Matched Capillary Pressure Parameters of 15 Chalk Samples

| | CPCs from Thomeer Type Curve Match | | | | | | | | |
|---|---|---|---|---|---|---|---|---|---|
| Sample No. | $P_{d1}$ | $B_1^\infty$ | $G_1$ | $P_{d2}$ | $B_2^\infty$ | $G_2$ | $P_{d3}$ | $B_3^\infty$ | $G_3$ |
| 1 | 0.059 | 198.820 | 43.314 | 0.000 | 0.000 | 0.000 | 0.000 | 0.000 | 0.000 |
| 2 | 0.052 | 207.978 | 42.850 | 0.000 | 0.000 | 0.000 | 0.000 | 0.000 | 0.000 |
| 3 | 0.055 | 212.580 | 42.976 | 0.000 | 0.000 | 0.000 | 0.000 | 0.000 | 0.000 |
| 4 | 0.065 | 213.105 | 33.484 | 0.000 | 0.000 | 0.000 | 0.000 | 0.000 | 0.000 |
| 5 | 0.062 | 205.573 | 36.476 | 0.000 | 0.000 | 0.000 | 0.000 | 0.000 | 0.000 |
| 6 | 0.066 | 217.745 | 34.782 | 0.000 | 0.000 | 0.000 | 0.000 | 0.000 | 0.000 |
| 7 | 0.168 | 2959.469 | 13.159 | 0.000 | 0.000 | 0.000 | 0.000 | 0.000 | 0.000 |
| 8 | 0.150 | 1861.458 | 14.053 | 0.000 | 0.000 | 0.000 | 0.000 | 0.000 | 0.000 |
| 9 | 0.138 | 1822.713 | 13.829 | 0.000 | 0.000 | 0.000 | 0.000 | 0.000 | 0.000 |
| 10 | 0.106 | 441.549 | 19.745 | 0.000 | 0.000 | 0.000 | 0.000 | 0.000 | 0.000 |
| 11 | 0.137 | 497.776 | 18.433 | 0.000 | 0.000 | 0.000 | 0.000 | 0.000 | 0.000 |
| 12 | 0.187 | 432.093 | 19.530 | 0.000 | 0.000 | 0.000 | 0.000 | 0.000 | 0.000 |
| 13 | 0.074 | 300.149 | 25.692 | 0.000 | 0.000 | 0.000 | 0.000 | 0.000 | 0.000 |
| 14 | 0.076 | 308.983 | 26.329 | 0.000 | 0.000 | 0.000 | 0.000 | 0.000 | 0.000 |
| 15 | 0.130 | 411.444 | 21.206 | 0.000 | 0.000 | 0.000 | 0.000 | 0.000 | 0.000 |

Figure 7A:
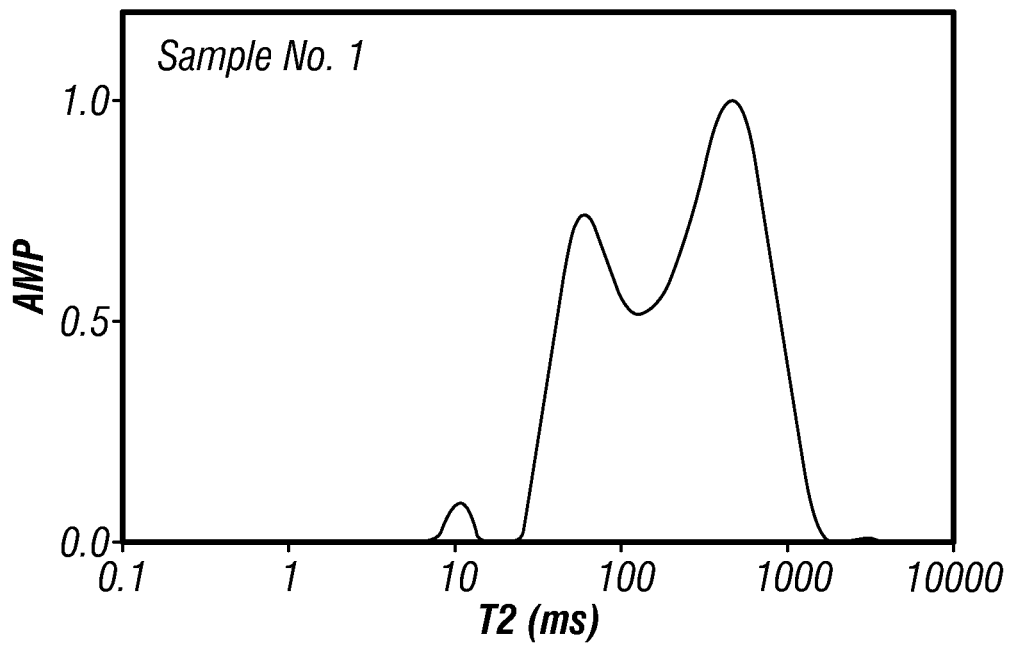
FIGS. 7a, 7b show two exemplary bimodal $T_2$ distributions for diagenetic chalk samples.
Figure 7B:
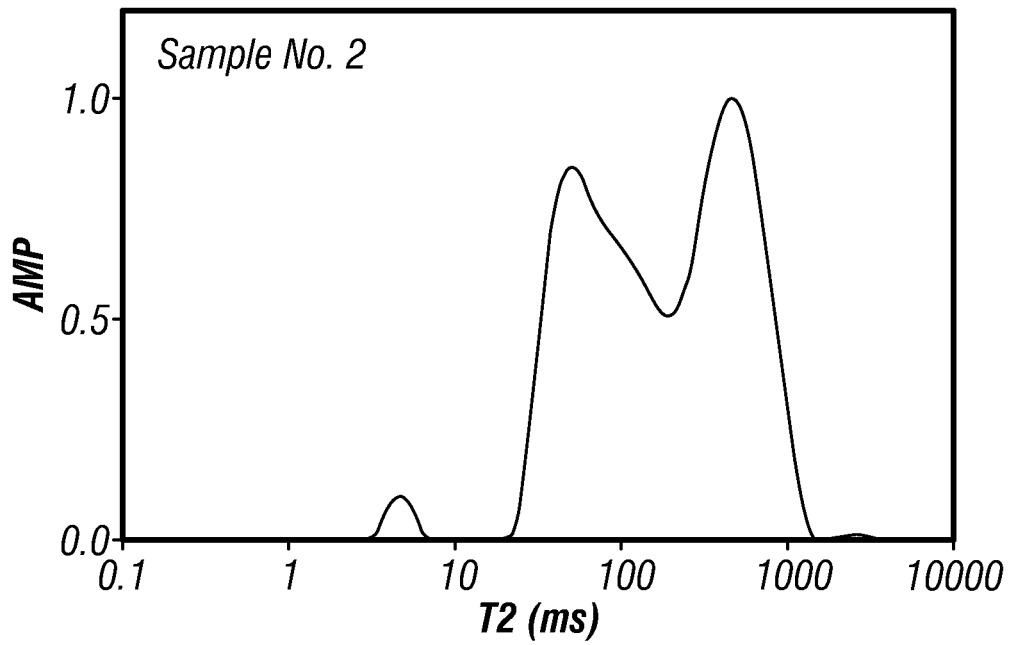

Table 2 shows the CPCs predicted from the $T_2$ distribution using the radial basis mapping eqn. (6).

type curve are shown in Table 3. The measured $T_2$ distributions are shown in FIG. 7. It is to be noted that all five samples

TABLE 2

Predicted Capillary Pressure Parameters of 15 Chalk Samples

| | CPCs Predicted Using NGRBF | | | | | | | | |
|---|---|---|---|---|---|---|---|---|---|
| Sample No. | $P_{d1}$ | $B_1^\infty$ | $G_1$ | $P_{d2}$ | $B_2^\infty$ | $G_2$ | $P_{d3}$ | $B_3^\infty$ | $G_3$ |
| 1 | 0.055 | 212.562 | 42.975 | 0.000 | 0.000 | 0.000 | 0.000 | 0.000 | 0.000 |
| 2 | 0.062 | 187.805 | 43.584 | 0.000 | 0.000 | 0.000 | 0.000 | 0.000 | 0.000 |
| 3 | 0.059 | 198.804 | 43.314 | 0.000 | 0.000 | 0.000 | 0.000 | 0.000 | 0.000 |
| 4 | 0.067 | 219.560 | 34.529 | 0.000 | 0.000 | 0.000 | 0.000 | 0.000 | 0.000 |
| 5 | 0.066 | 217.766 | 34.788 | 0.000 | 0.000 | 0.000 | 0.000 | 0.000 | 0.000 |
| 6 | 0.062 | 205.823 | 36.376 | 0.000 | 0.000 | 0.000 | 0.000 | 0.000 | 0.000 |
| 7 | 0.150 | 1861.458 | 14.053 | 0.000 | 0.000 | 0.000 | 0.000 | 0.000 | 0.000 |
| 8 | 0.168 | 2943.643 | 13.168 | 0.000 | 0.000 | 0.000 | 0.000 | 0.000 | 0.000 |
| 9 | 0.150 | 1861.294 | 14.053 | 0.000 | 0.000 | 0.000 | 0.000 | 0.000 | 0.000 |
| 10 | 0.130 | 411.444 | 21.206 | 0.000 | 0.000 | 0.000 | 0.000 | 0.000 | 0.000 |
| 11 | 0.187 | 432.093 | 19.530 | 0.000 | 0.000 | 0.000 | 0.000 | 0.000 | 0.000 |
| 12 | 0.137 | 497.776 | 18.433 | 0.000 | 0.000 | 0.000 | 0.000 | 0.000 | 0.000 |
| 13 | 0.076 | 308.983 | 26.329 | 0.000 | 0.000 | 0.000 | 0.000 | 0.000 | 0.000 |
| 14 | 0.074 | 300.149 | 25.692 | 0.000 | 0.000 | 0.000 | 0.000 | 0.000 | 0.000 |
| 15 | 0.106 | 441.548 | 19.746 | 0.000 | 0.000 | 0.000 | 0.000 | 0.000 | 0.000 |

Figure 8:
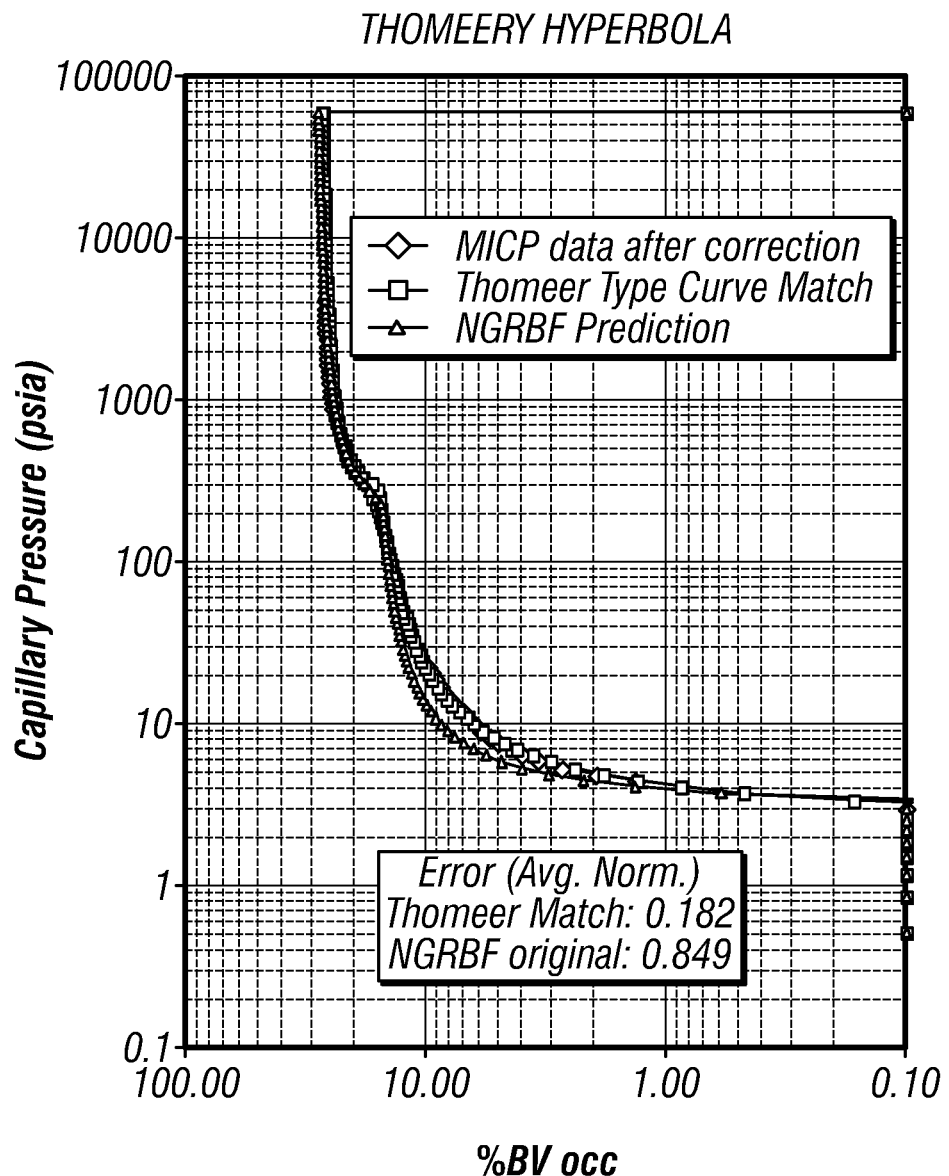
FIG. 8 shows Thomeer Hyperbola prediction for diagenetic chalk samples.

The results in Table 2 were obtained using the "leave one out method" whereby each sample was removed from the database and its CPCs were predicted from the remaining 14 samples in the database. From the numerical values one can see that the CPCs predicted from the $T_2$ distributions using eqn. (6) are in good agreement with the CPCs obtained from now show bimodal modal capillary pressure behavior (two sets of $P_d$, $B^\infty$ and G). One typical match (Sample No. 3) is shown in FIG. 8. As can be seen, while the match between the corrected MICP data, the Thomeer Type curve and the NGRBF prediction are not as good as in FIG. 6 (for unimodal samples), the agreement is still reasonably good.

TABLE 3

Matched Capillary Pressure Parameters of 5 DC Samples

| | CPCs from Thomeer Type Curve Match | | | | | | | | |
|---|---|---|---|---|---|---|---|---|---|
| Sample No. | $P_{d1}$ | $B_1^\infty$ | $G_1$ | $P_{d2}$ | $B_2^\infty$ | $G_2$ | $P_{d3}$ | $B_3^\infty$ | $G_3$ |
| 1 | 0.767 | 5.356 | 22.295 | 0.093 | 251.585 | 7.693 | 0.000 | 0.000 | 0.000 |
| 2 | 0.448 | 2.881 | 19.187 | 0.268 | 196.700 | 11.735 | 0.000 | 0.000 | 0.000 |
| 3 | 0.843 | 2.257 | 23.571 | 0.097 | 271.028 | 8.077 | 0.000 | 0.000 | 0.000 |
| 4 | 0.783 | 5.198 | 23.013 | 0.105 | 248.559 | 8.091 | 0.000 | 0.000 | 0.000 |
| 5 | 0.381 | 22.403 | 21.928 | 0.121 | 156.768 | 7.727 | 0.000 | 0.000 | 0.000 |

Figure 9:
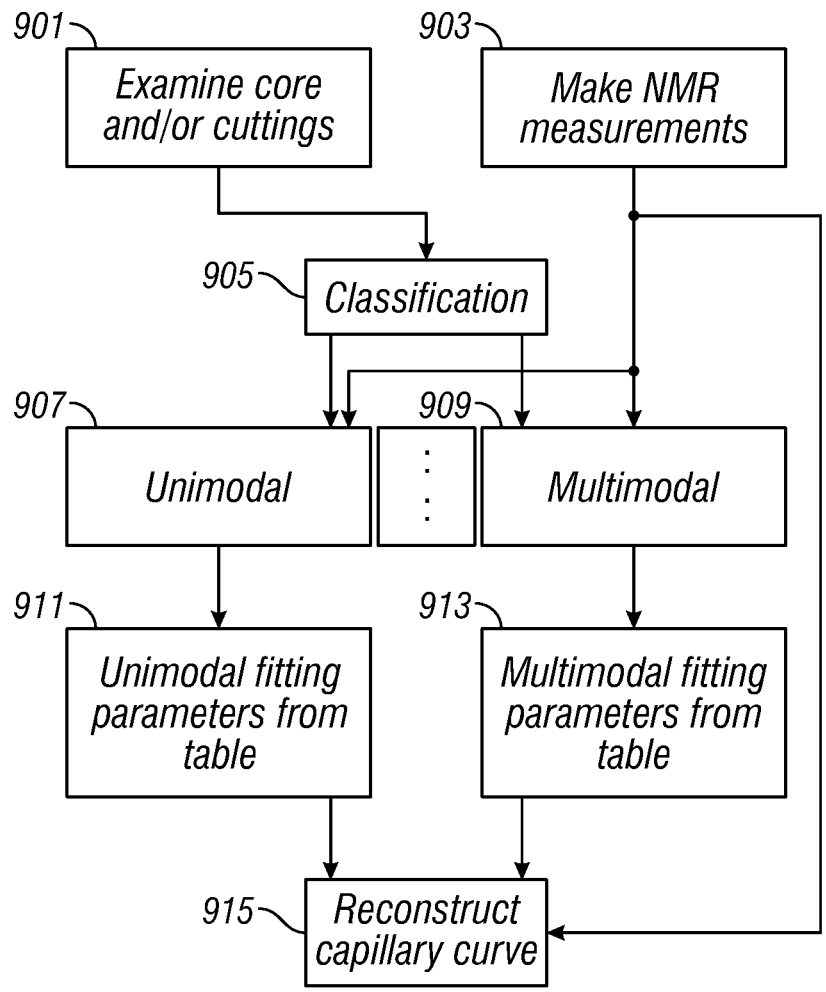
FIG. 9 shows a flow chart of some of the methods of the present disclosure.

FIG. 9 is a flowchart illustrating an embodiment of the disclosure. At 901, cores and/or cuttings may be examined. At 903, NMR measurements are made using a sensor on a wireline or while drilling. At 905, analysis of cuttings and/or core samples is carried out to obtain a classification of the rock. The cuttings are brought to the surface by mud flow through the annulus between the drilling tubular and the borehole wall. Classification of individual cuttings can then be made by an operator, such as an on-site geologist. The rock may be classified as a siliclastic rock or as a carbonate rock. The classification of the type of carbonate is made using an acceptable classification system, such as Dunham, Lucia, or Melin.

Based on the classification of the carbonate, a decision is made as to what type of $T_2$ distribution characterizes the rock. This could be a unimodal 911 or a multimodal distribution 913. In the case of a unimodal distribution, parameters of a single unimodal distribution 911 derived using a Thomeer Hyperbola curve match as discussed above are used to predict formation capillary pressure curve 915. In the case of a multimodal $T_2$ distribution, parameters of a plurality of distributions using a Thomeer Hyperbola curve match are used.

As noted above, the parameters of the Thomeer hyperbola fitting procedure are derived using samples from a suitable database such as the Rock Catalog. Radial basis functions are used to construct a nonlinear mapping from a vector input (e.g. spin echo amplitudes, and $T_2$ amplitudes) to a vector output (CPCs: $P_{d1}$, $B_1^\infty$, $G_1$; $P_{d2}$, $B_2^\infty$, $G_2$; $P_{d3}$, $B_3^\infty$, $G_3$). The inputs such as spin echo amplitudes and $T_2$ amplitudes may be referred to as NMR measurements associated with each sample in the database. For the purposes of the present disclosure, each sample has an associated measurement that could be a spin echo amplitude and/or a $T_2$ amplitude obtained by inversion of the spin-echo measurements.

It should be noted that while the disclosure above has been specific with the use of carbonate samples from the Rock Catalog, this is not intended to be a limitation. The same procedure can be used for siliclastic rocks. It is likely that $T_2$ distributions for siliclastic rocks are more likely to be unimodal if there has been no post-depositional diagenesis. In one embodiment of the disclosure, the classification step may be bypassed as indicated by the arrows from 903 to 907 and 909. When the classification step is bypassed, $T_2$ distributions obtained by inversion of the spin echo signals directly give the number of modes of the $T_2$ distribution.

In another embodiment of the disclosure, formation permeability is predicted directly from NMR measurements. The motivation for this is provided by models of Thomeer and Swanson, given respectively by the equations:

$$K_a = 3.8068 G^{-1.3334}(B_V^\infty/P_d)^2 \quad (7)$$

and $$K_a = 399(B_V/P_c)_{max}^{1.69} \quad (8)$$

Figure 10:
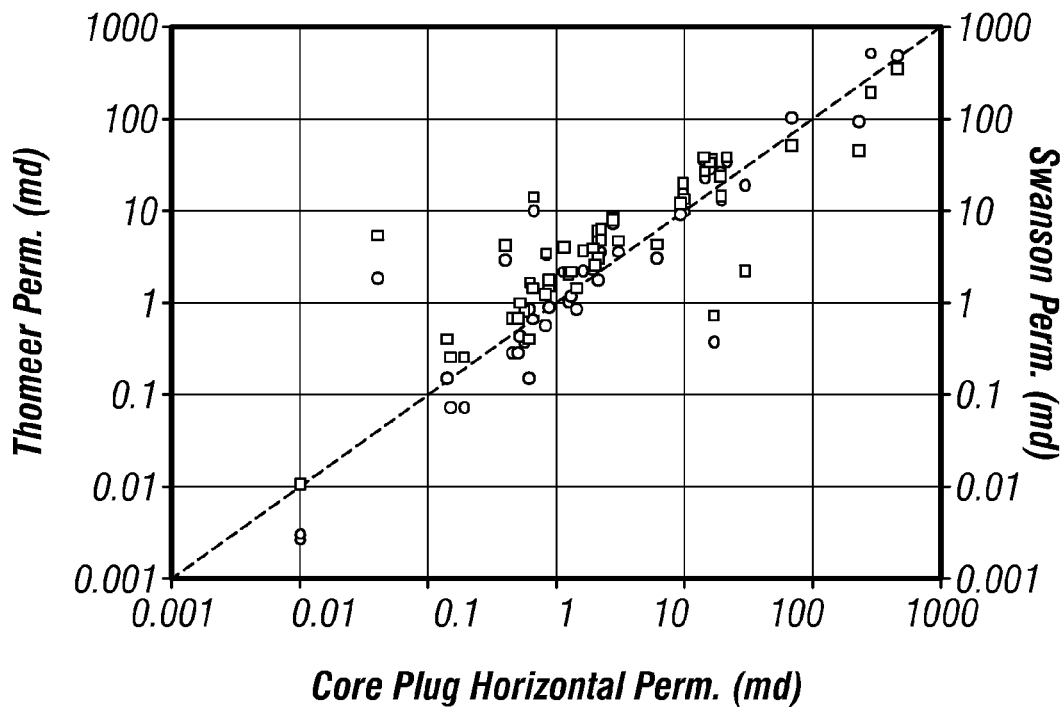
FIG. 10 is a plot of predicted permeabilities from the Thomeer model (circles) and the Swanson model (squares) as a function of measured permeability.

Permeabilities derived from both models are compared with lab-measured horizontal permeability for the first four entries in ART catalogue (Table 4). The results are shown in FIG. 10. Predictions by the Thomeer model are shown by circles while the predictions from the Swanson model are shown by squares.

TABLE 4

| Sample Type | Origin | Porosity Range (p.u.) | Perm. Range (md) |
|---|---|---|---|
| Chalk (CH) | North Sea | 12-44 | 0-3.8 |
| Diagenetic Chalk (DC) | Abu Dhabi | 18-28 | 0.6-449 |
| Microcrystalline Dolomite (MD) | Texas | 1-21 | 0.04-29 |
| Oolitic Limestone (OL) | Tunisia & Kansas | 14-37 | 0.4-19 |
| Sucrosic Dolomite (SC) | Oklahoma | 4-8 | 0.01-0.09 |
| Vuggy Dolomite (VD) | Alberta | 2-15 | 0.2-1333 |

For the samples included in the above crossplot, both Thomeer and Swanson models give satisfactory results. This indicates that if one could match capillary pressure parameters with enough confidence, permeability could potentially be a given. There are, however, still plenty of similar crossplots in the literature showing bad correlations between these models and experimental data. In fact, if we were to include two more entries, namely sucrosic (SD) and vuggy (VD) dolomites in the crossplot, the data will be much more scattered. Once again, we are being reminded of the complexity of the problems in carbonates.

Figure 11:
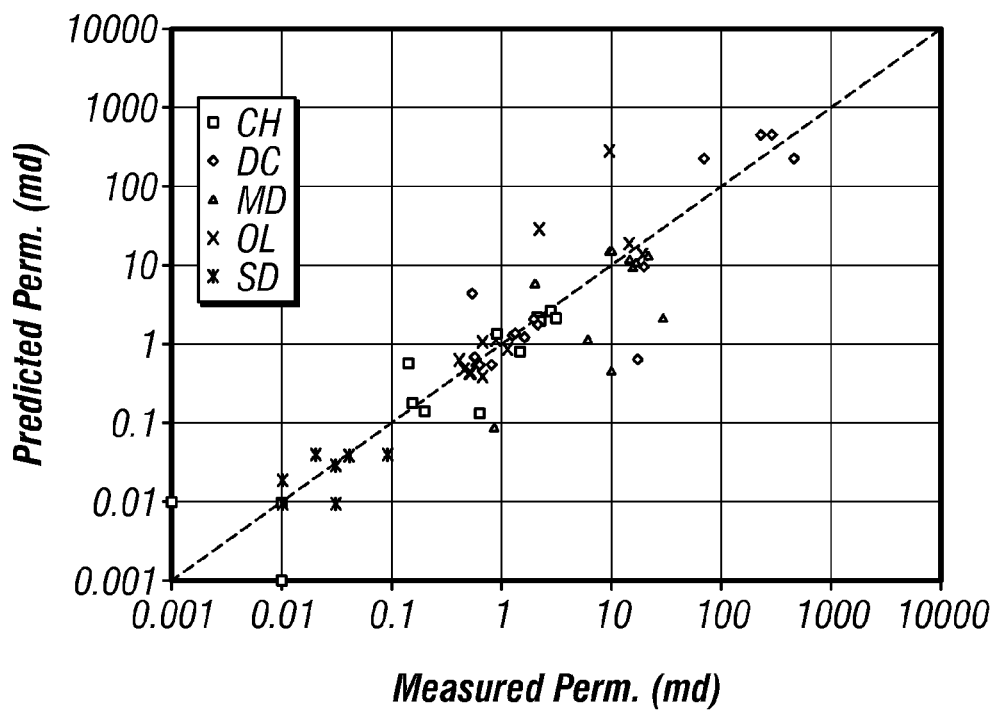
FIG. 11 is a plot of permeability prediction from inverted NMR data using the method of the present disclosure, for a single prediction of the database with VD samples being excluded.

FIG. 11 shows the permeability prediction that is obtained based on one single database that contains the entire carbonate catalog (VD samples excluded). No rock type classification was performed before prediction and the NMR inverted $T_2$ distribution with amplitude normalization was used as input. As can be seen here, even without detailed classification, the predicted permeabilities match very well with lab-measured results with at most one order of magnitude difference. Further improvement in prediction is, however, possible by conducting individual prediction for each rock type.

Figure 12:
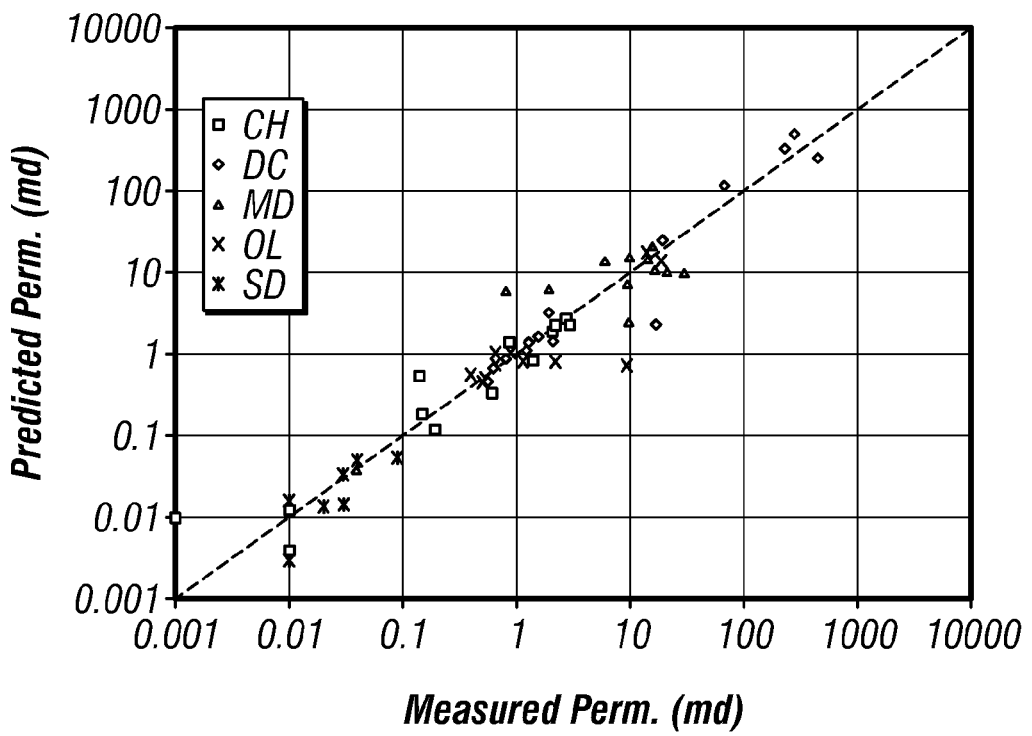
FIG. 12 is a plot of permeability prediction from inverted NMR data using the method of the present disclosure, where the prediction is done for individual carbonate types.

FIG. 12 shows the data of FIG. 11 where the prediction is done for individual groups of carbonates. The figure is annotated with the carbonate type. The agreement is much better with a discrepancy of no more than 100%.

One disadvantage of using inverted $T_2$ distribution is that it depends on many details of how the inversion code is set up. Useful information could be lost in the inversion process. One way around this is to construct the database using NMR spin-echo train (NMR raw data), which contains essentially all the information we could possibly have, including noise. One steps in the NGRBF procedure that has been used so far is the amplitude normalization of the input signals. This step is based on the consideration of removing the differences in amplitudes caused by hardware or software calibrations.

However, for NMR measurements, porosity information is embedded in the signal amplitudes. By normalizing the amplitudes to unity, the contrast in porosity between different samples is lost. On the other hand, porosities are oftentimes believed to correlate with permeabilities. Accordingly, several different algorithms used for handling amplitudes in the same context of permeability prediction are discussed.

Figure 13:
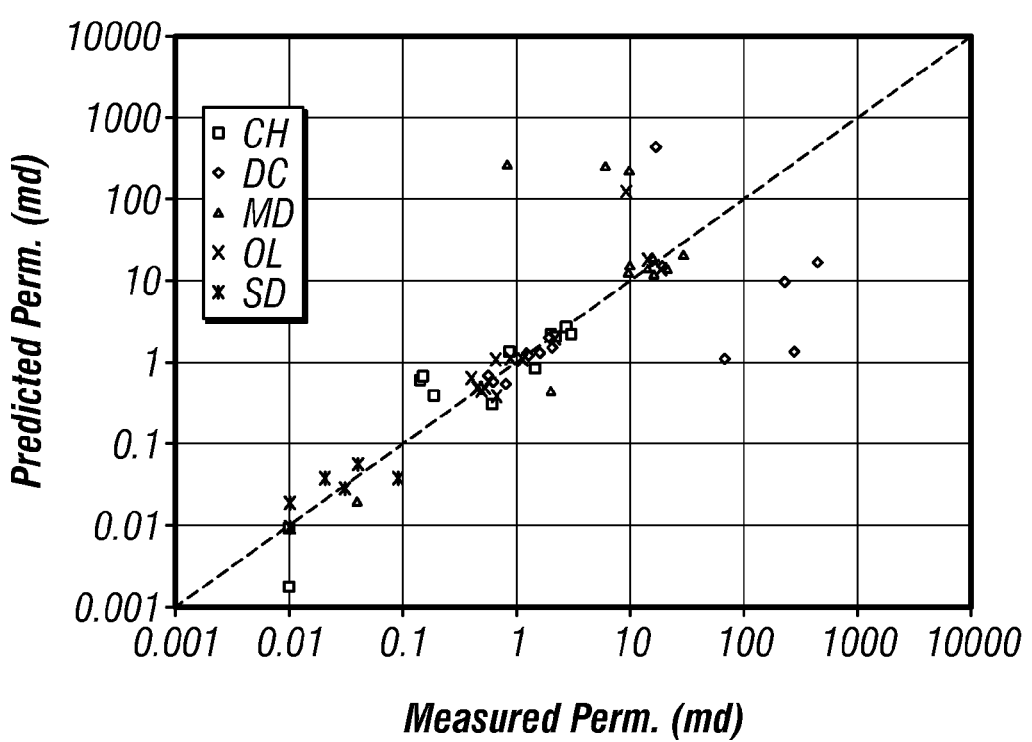
FIG. 13 is a plot of permeability prediction from NMR echo trains using the method of the present disclosure, for a single prediction of the database with VD samples being excluded.
Figure 14:
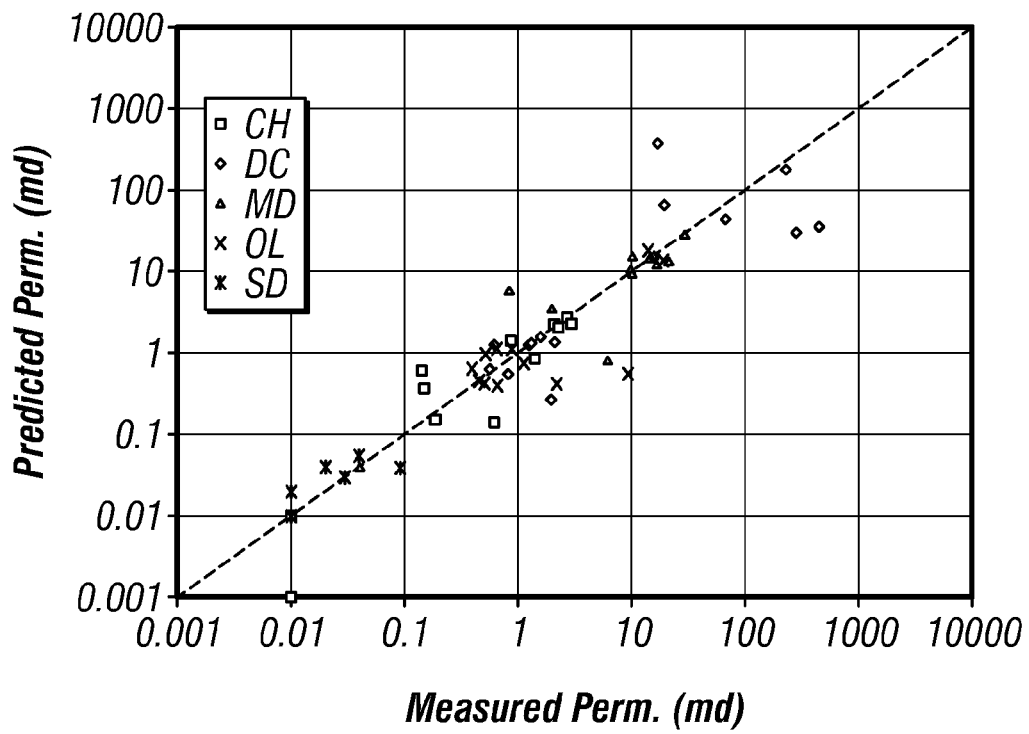
FIG. 14 is a plot of permeability prediction from NMR echo trains using the method of the present disclosure, where the prediction is done for individual carbonate types.

FIG. 13 is a plot of permeability prediction from NMR echo trains using the method of the present disclosure, for a single prediction of the database with VD samples being excluded. FIG. 14 is a plot of permeability prediction from NMR echo trains using the method of the present disclosure, where the prediction is done for individual carbonate types. Due to the noise level of the NMR raw data, the prediction using spin-echo trains is not as good as the one from inverted $T_2$ distribution but still within an acceptable error range.

Figure 15:
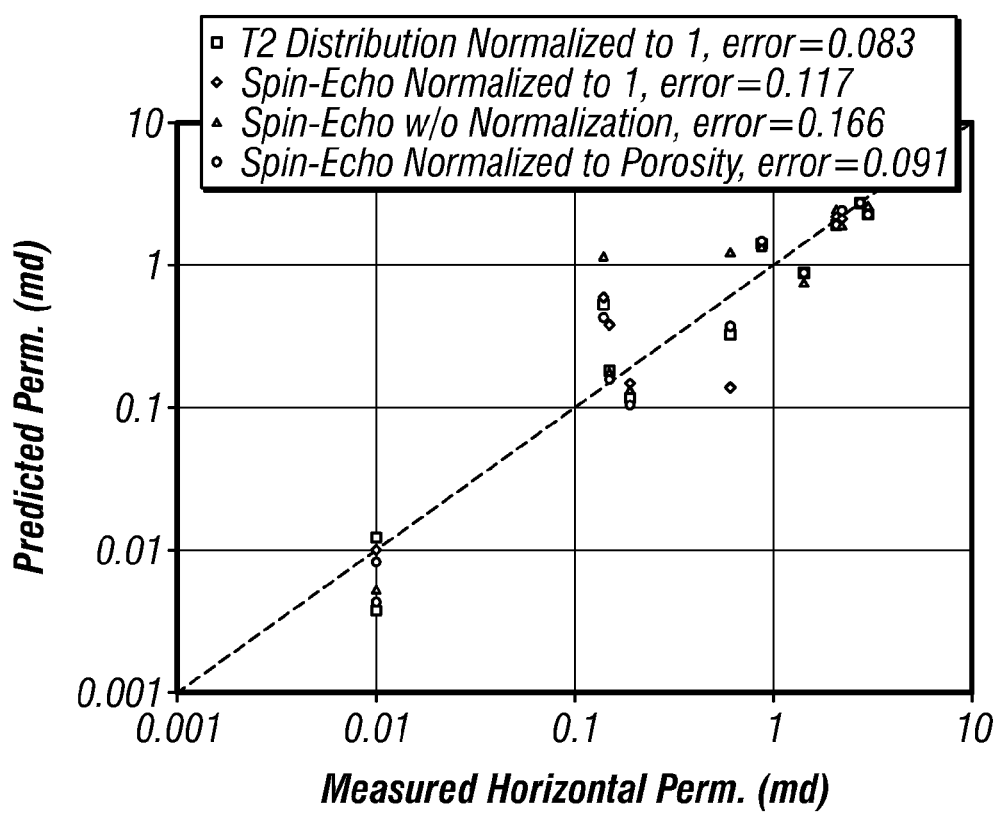
FIG. 15 is a comparison between different methods of processing amplitude information for the Chalk samples.
Figure 16:
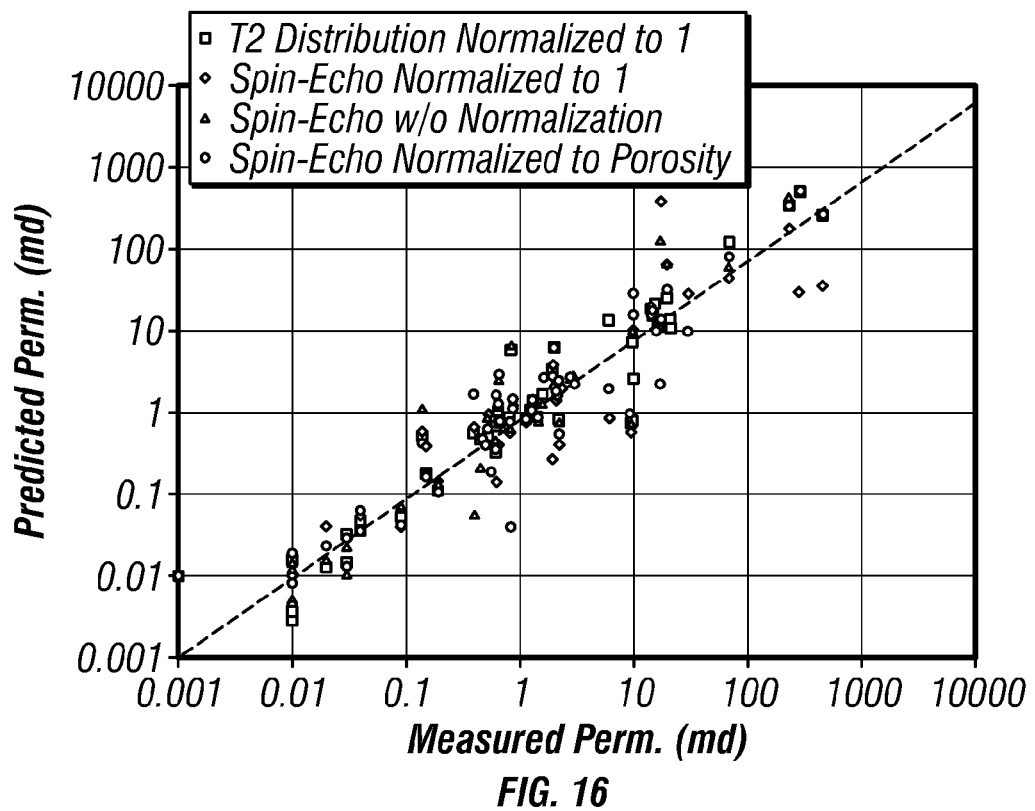
FIG. 16 is a comparison between different methods of processing amplitude information for all of the samples.
Figure 17:
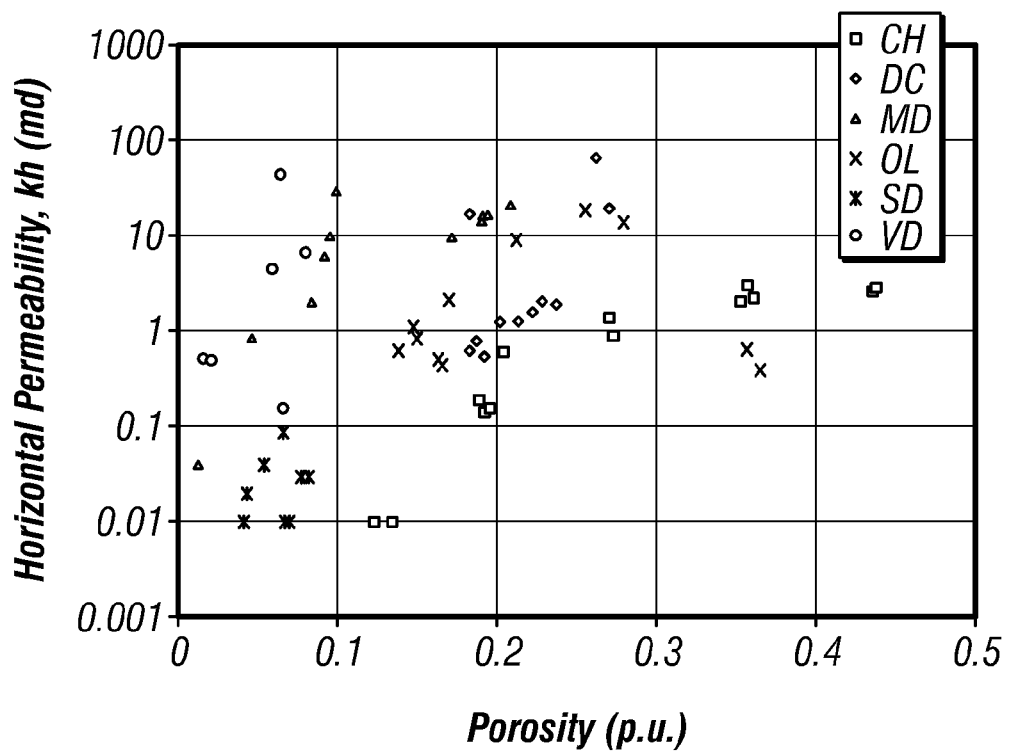
FIG. 17 is a cross plot of permeability and porosity for all the samples.

FIG. 15 is a comparison between different methods of processing amplitude information for the Chalk samples. FIG. 16 is a comparison between different methods of processing amplitude information for all of the samples. As can be seen in the two figures, data points from different algorithms almost overlap one another, indicating that porosity is not a sensitive factor in permeability predictions for current database. A crossplot of permeability and porosity is shown in FIG. 17. As expected, there is no strong correlation between porosity and permeability. As a result, it is not expected to see better predictions after including porosity information (from algorithm w/o normalization).

Figure 18:
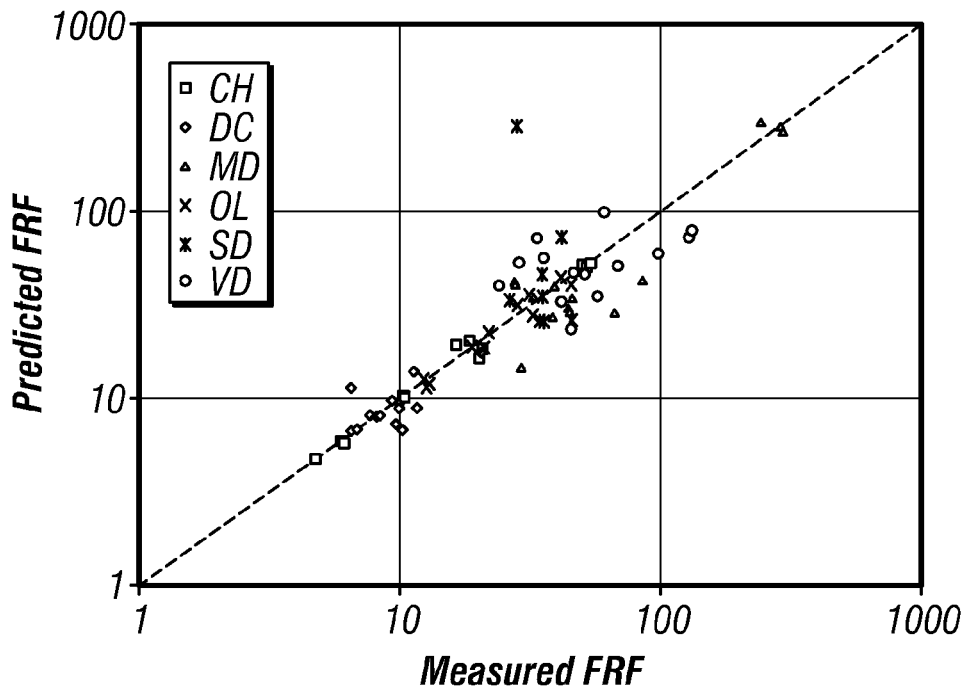
FIG. 18 is a cross plot of predicted formation resistivity factor and measured formation resistivity factor for all the samples.

Another property of interest of an earth formation is the formation resistivity factor. Formation resistivity factor is an intrinsic property of a porous insulating medium, related to the degree of efficiency or inefficiency for the electrolyte-filled paths to conduct electrical current through the medium. Therefore, by definition it is also closely related to the pore network, and thus NMR measurements. FRF data are readily available in the ART catalogue. The predictability of FRF from NMR data was studied using the same procedure for CPC parameters and permeabilities. It is found that FRF prediction from $T_2$ distribution is satisfactory even without any petrophysical classification. This is shown in FIG. 18.

Figure 19:
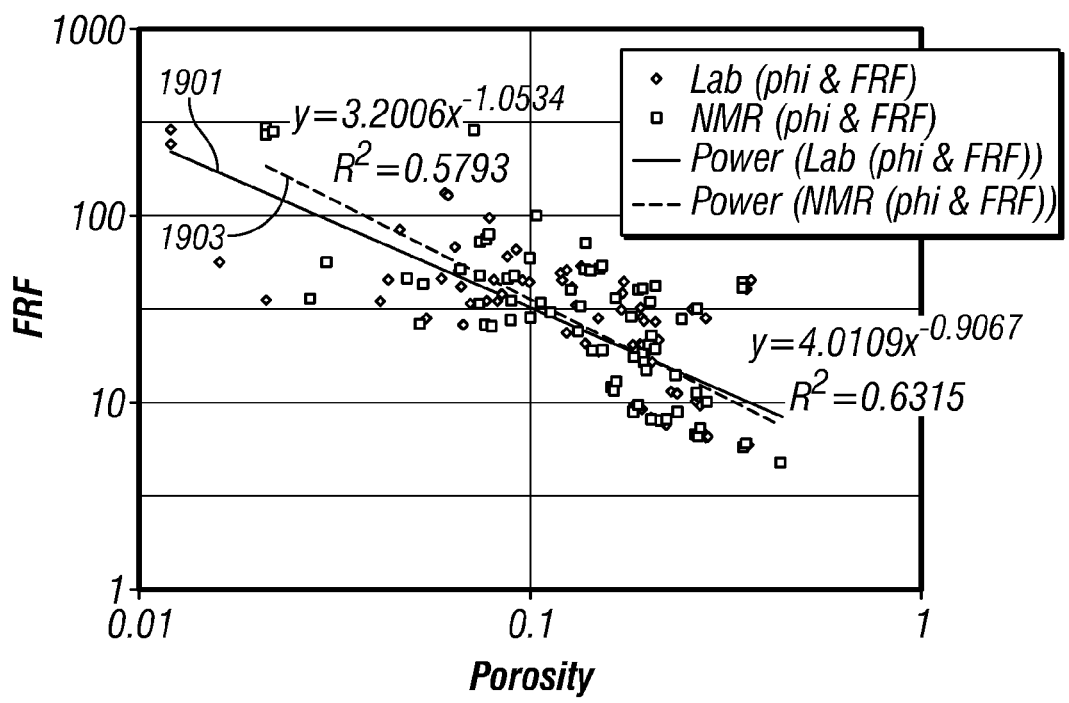
FIG. 19 is a cross plot of the Archie's equations from lab and NMR data.

One extension of the FRF discussion is Archie's equation and cementation factor, m. The capability of generating FRF from NMR measurements gives an independent estimation of cementation factor. The equation is given as:

$$C_t = \frac{1}{a} C_w \phi^m S_w^m$$

Where $\phi$ denotes porosity, $C_t$ is the electrical conductivity of the fluid saturated rock, $S_w$ is the brine saturation, m is the cementation exponent, and a is the torutosity factor. A comparison of Archie's plots from lab measurement and NMR data is shown in FIG. 19. 1903 gives the Archie regression from NMR derived porosity and formation factor while 1901 gives the Archie regression from laboratory measurements of porosity and formation factor.

Implicit in the processing of the data is the use of a computer program implemented on a suitable machine readable medium that enables the processor to perform the control and processing. The machine readable medium may include ROMs, EPROMs, EAROMs, Flash Memories and Optical disks.

While the foregoing disclosure is directed to specific embodiments of the disclosure, various modifications will be apparent to those skilled in the art. It is intended that all variations within the scope and spirit of the appended claims be embraced by the foregoing disclosure.

APPENDIX

Mathematical Basics for Radial Basis Function Interpolation

Let $\vec{f}(\vec{x})$, $\vec{x} \in R^n$, and $\vec{f} \in R^m$, be a real-valued vector function of n variables, and let values of $f(\vec{x}_i) = \vec{y}_i$ be given at N distinct points, $\vec{x}_i$. The interpolation problem is to construct the function $\vec{F}(\vec{x})$ that approximates $\vec{f}(\vec{x})$ and satisfies the interpolation equations:

$$\vec{F}(\vec{x}_i) = \vec{y}_i, i = 1, 2, \ldots, N \quad (A.1)$$

RBF interpolation chooses an approximating or mapping function of the form $$\vec{F}(\vec{x}) = \sum_{i=1}^{N} \vec{c}_i \varphi(\|\vec{x} - \vec{x}_i\|) \quad (A.2)$$

The non-linear function, $\phi$, is known as an RBF. The argument of the RBF depends on the Euclidean norm in n-dimensional space; i.e., $$\|\vec{x} - \vec{x}_i\| = \sqrt{\sum_{m=1}^{n} (x_m - x_{i,m})^2} \quad (A.3)$$

The functions are called "radial" because they depend only on the distance, not the direction, of $\vec{x}_i$ from an arbitrary input vector, $\vec{x}$, at which the function is to be evaluated.

The real coefficients $\vec{c}_i$ are determined by requiring that the interpolation equations be satisfied exactly. Therefore, the coefficients are a linear combination of the given function values, $$\vec{c}_i = \sum_{j=1}^{N} \Phi_{i,j}^{-1} \vec{y}_j \quad (A.4)$$

where $\Phi_{i,j} \equiv \phi(\|\vec{x}_i - \vec{x}_j\|)$ is the N×N interpolation matrix.

One of the features of RBFs is that for certain functional forms, including Gaussian, multiquadric, and inverse multiquadric forms, mathematicians have proved that the interpolation matrix is nonsingular. This means that for these functions, the mapping function $\vec{F}(\vec{x})$ is uniquely determined. RBF interpolation has other attractive properties not possessed by classical interpolation schemes such as polynomial splines or finite difference approximations. It has been found that RBF interpolation does not require the data to be on a uniform lattice and has been shown to provide good results with scattered datasets. Furthermore, numerical experiments have shown that for a given number of data points, N, the accuracy of the interpolation is independent of the number of independent variables, n, even for very large values of n.

The previous section introduced RBF interpolation from a purely mathematical point of view. Next the use of this modern method for approximating functions of many variables to solve inverse problems is discussed.

Inverse problems encountered in well logging and geophysical applications may involve predicting the physical properties of some underlying system given a set of measurements. Consider a data base having a set of distinct input data $\vec{x} \in R^n$ (i.e., the inputs are n-dimensional vectors) and a set of corresponding real out puts, $\vec{y}_i \in R^m$, for i=1, ..., N, where N is the number of cases in the database. The different cases in the database represent different states of the underlying physical system. In the mathematical language of RBF interpolation, $\vec{y}_i$ values represent samples of the function that one wants to approximate, and $\vec{x}_i$ values are the distinct points at which the function is given. The database inputs, $\vec{x}_i$, represent the measurements from which one would like to predict the physical properties of the under lying system. The data base out puts, $\vec{y}_i$, are the physical properties we want to predict from the measurements. The database is used to construct a mapping function such that, given measurements $\vec{x}$ that are not in the database, one can predict the properties $\vec{F}(\vec{x})$ of the physical system that is consistent with the measurements. The mapping function solves the inverse problem by predicting the physical properties of the system from the measurements Next we explain the database construction in the context of current problem: to predict the capillary pressure curves from NMR measurements. For wetting fluid saturated rocks, NMR relaxation time distribution correlates with pore size distribution from which capillary pressure curves can be derived. However, the traditional method can have large errors when applied to complex carbonate rocks. RBF interpolation can be used to make more accurate predictions. The database is constructed by acquiring NMR measurements on a suite of N carbonate samples over a representative range of lithology, porosity and permeability. The inputs to the database would be, for each carbonate sample, a vector whose elements are the NMR data (e.g., raw spin-echo train data, or $T_2$ distribution) for that sample. The database outputs are the parameters that could be used to reconstruct corresponding capillary pressure curves. The parameterization of capillary pressure curves is another key part of current method and will be discussed in more detail in a subsequent section. In one embodiment, the database outputs are numerical values obtained by Thomeer (1960) hyperbola type curve match on MICP data for each carbonate sample. Using this database, a radial basis mapping function can be constructed so that capillary pressure curve can be predicted from NMR measurements.

The RBFs used in current method are the normalized Gaussian RBFs defined by the equation:

$$\varphi(\|\vec{x}-\vec{x}_i\|) = \frac{\exp\left(-\frac{\|\vec{x}-\vec{x}_i\|^2}{2s_i^2}\right)}{\sum_{j=1}^{N}\exp\left(-\frac{\|\vec{x}-\vec{x}_j\|^2}{2s_j^2}\right)} \quad (A.5)$$

Other radial basis functions, for example, without limitation, exponential, multiquadrics, or inverse multiquadrics, could also be used.

One of the attractive features of using multivariate NGRBFs is that they can be written as products of univariate functions. These functions are normalized in the sense that summation over the database inputs, $\vec{x}_i$, is equal to unity for all $\vec{x}$, i.e., $$\sum_{i=1}^{N}\varphi(\|\vec{x}-\vec{x}_i\|) = 1 \quad (A.6)$$

It is also easily seen from the NGRBF definition that $$0 \le \varphi(\|\vec{x}-\vec{x}_i\|) \quad (A.7)$$

By combining the above equations, one can write the mapping function for NGRBFs as $$\vec{F}(\vec{x}) = \frac{\sum_{i=1}^{N}\vec{c}_i \exp\left(-\frac{\|\vec{x}-\vec{x}_i\|^2}{2s_i^2}\right)}{\sum_{i=1}^{N}\exp\left(-\frac{\|\vec{x}-\vec{x}_i\|^2}{2s_i^2}\right)} \quad (A.8)$$

The width, $s_i$, of the Gaussian RBF centered at $\vec{x}_i$ is representative of the range or spread of the function in the input space. The optimal widths, for accurate approximations, should be of the order of the nearest-neighbor (NN) distance in the input space. The idea is to pave the input space with basis functions that have some overlap with nearest neighbors but negligible overlap with more distant neighbors. This ensures that for an input $\vec{x}$ that is not in the database, the output $\vec{F}(\vec{x})$ is computed as a weighted average of contributions from those database inputs $\vec{x}_i$ that are nearest to $\vec{x}$. The interpolation points in the database that are far from $\vec{x}$ make a negligible contribution to $\vec{F}(\vec{x})$.

In practical applications, good results can often be obtained by using a single width parameters (s) for all of the basis functions. Likewise it is sometimes useful to select a subset of the database input vectors for the centers of the radial basis functions. In this case the interpolation matrix is not square but can nevertheless be inverted, for example, using a pseudo inverse. For very large databases one can choose a subset of the database input vectors by using a clustering algorithm to consolidate groups of nearby inputs. Optimal widths for the radial basis functions can be determined by selecting widths comparable to nearest neighbor distances separating the input vectors. The following discusses an approximation for the weight vectors and provides some intuitive insight into how the radial basis mapping function interpolates in the database to predict the output vectors.

An intuitive understanding of how the mapping function predicts an output vector for an input vector not in the database can be gained by considering the Nadaraya-Watson Regression Estimator (NWRE) (Jones, 1994). The NWRE is based on a simple approximation for the coefficient vectors. The interpolation equations for the mapping function can be written in the form:

$$\vec{F}(\vec{x}) = \frac{\vec{c}_j + \sum_{\substack{i=1 \\ i \ne j}}^{N} \vec{c}_i \exp\left(-\frac{\|\vec{x}-\vec{x}_i\|^2}{2s_i^2}\right)}{1 + \sum_{\substack{i=1 \\ i \ne j}}^{N} \exp\left(-\frac{\|\vec{x}-\vec{x}_i\|^2}{2s_i^2}\right)} \quad (A.9)$$

The summations in the above equation can be neglected if one neglects the overlap of the database RBFs. The NWRE approximation assumes that the interpolation matrix is diagonal and leads to a simple approximation for the coefficient vectors, such that $$\vec{F}(\vec{x}_j) \equiv \vec{y}_j = \vec{c}_j \qquad (A.10)$$

This simple approximation replaces the coefficient vectors with the database output vectors $\vec{y}_j$. For many practical problems, the NWRE approximation works well and is always a good starting point for testing RBF predictions. Computing the coefficient using equation (A.4) provides a refinement to the approximation.

By combining equations (A.8) and (A.10), one obtains the NWRE mapping function:

$$\vec{F}(\vec{x}) = \frac{\sum_{i=1}^{N} \vec{y}_i \exp\left(-\frac{\|\vec{x} - \vec{x}_i\|^2}{2s_i^2}\right)}{\sum_{i=1}^{N} \exp\left(-\frac{\|\vec{x} - \vec{x}_i\|^2}{2s_i^2}\right)} \qquad (A.11)$$

Note that in the limit of very large $s_i$, $\vec{F}(\vec{x})$ approaches the sample mean of the database output vectors. In the limit of very small $s_i$, $\vec{F}(\vec{x})$ approaches the output vector $\vec{y}_j$ that corresponds to the database input vector $\vec{x}_j$ that is closest to $\vec{x}$. In general, $\vec{F}(\vec{x})$ is a weighted average of the database output vectors with RBF weighting factors determined by the closeness of $\vec{x}$ to the database input vectors. Note that the NWRE approximation in equation (A.11) does not satisfy the interpolation conditions of equation (A.1).

The NWRE approximation can be improved by determining optimal coefficient vectors such that the interpolation equations are satisfied. The problem is linear if the widths of the NGRBFs are fixed. Interpolation conditions lead to a set of linear equations for the coefficient vectors, whose solution can be written in the matrix form as:

$$C = \Phi^{-1} \cdot Y \qquad (A.12)$$

where the N×m matrix, C is given by $$C = \begin{bmatrix} c_{1,1} & c_{1,2} & \cdots & c_{1,m} \\ c_{2,1} & c_{2,2} & \cdots & c_{2,m} \\ \cdots & \cdots & \cdots & \cdots \\ c_{N,1} & c_{N,2} & \cdots & c_{N,m} \end{bmatrix} \qquad (A.13)$$

where the ith row of C is the transpose of the coefficient vectors for the ith database case. That is, the first subscript on each coefficient runs form 1 to N and denotes a particular database case and the second subscript denotes a particular element of the database output vectors and runs from 1 to m. The matrix $\Phi$, whose inverse appears in equation (A.4), is the N×N positive definite matrix of NGRBFs, i.e., $$\Phi = \begin{bmatrix} \varphi_{1,1} & \varphi_{1,2} & \cdots & \varphi_{1,N} \\ \varphi_{2,1} & \varphi_{2,2} & \cdots & \varphi_{2,N} \\ \cdots & \cdots & \cdots & \cdots \\ \varphi_{N,1} & \varphi_{N,2} & \cdots & \varphi_{N,N} \end{bmatrix} \qquad (A.14)$$

where the matrix elements are the NGRBFs:

$$\varphi_{i,j} = \frac{\exp\left(-\frac{\|\vec{x}_i - \vec{x}_j\|^2}{2s_j^2}\right)}{\sum_{j=1}^{N} \exp\left(-\frac{\|\vec{x} - \vec{x}_j\|^2}{2s_j^2}\right)} \qquad (A.15)$$

The N×m matrix, Y, in equation (A.15) contains the database output vectors:

$$\Phi = \begin{bmatrix} \varphi_{1,1} & \varphi_{1,2} & \cdots & \varphi_{1,N} \\ \varphi_{2,1} & \varphi_{2,2} & \cdots & \varphi_{2,N} \\ \cdots & \cdots & \cdots & \cdots \\ \varphi_{N,1} & \varphi_{N,2} & \cdots & \varphi_{N,N} \end{bmatrix} \qquad (A.16)$$

Note that the ith row is the transpose of the database vectors $\vec{y}_i$. The solution for the coefficients given in equations (A.12-A.16) improves the NWRE approximation by determining optimal coefficient vectors with the caveat of heaving fixed widths for the NGRBFs.

What is claimed is:

1. A method of estimating a value of a property of interest of an earth formation, the method comprising:
   deriving a radial basis function to estimate the value using an estimate for a pore modality of the earth formation and at least one of: (i) a database comprising a plurality of samples and (ii) an nuclear magnetic resonance (NMR) measurement associated with each sample in the database and related to NMR spin-echo signals; and
   estimating the value using the NMR spin-echo signals and the radial basis function, the spin-echo signals being acquired using an NMR sensor assembly in a borehole penetrating the earth formation.

2. The method of claim 1, further comprising:
   conveying the NMR sensor assembly in the borehole; and
   acquiring the spin-echo signals using the NMR sensor assembly.

3. The method of claim 1 wherein deriving the radial basis function comprises deriving the radial basis function using a classification of the earth formation into at least one of: (i) a sililclastic formation, (ii) carbonate based on a Dunham classification scheme, (iii) a carbonate based on a Lucia classification scheme, and (iv) a carbonate based on a Melim classification scheme.

4. The method of claim 1 wherein deriving the radial basis function comprises deriving the radial basis function using a classification based on the number of modes of a transverse relaxation time ($T_2$) distribution derived from the spin-echo signals.

5. The method of claim 1 wherein the property of interest is selected from the group consisting of: (i) a formation capillary pressure, (ii) a formation permeability, (iii) a formation resistivity factor, and (iv) a parameter of Archie's equation.

6. The method of claim 5 further comprising: estimating at least three parameters characterizing a hyperbolic fitting function of the formation capillary pressure in mercury injection capillary pressure data.

7. The method of claim 5 further comprising: estimating parameters of a fitting function that approaches infinity as a wetting-phase saturation approaches an irreducible water saturation, $S_{wir}$ and a slope near zero as the wetting phase saturation approaches unity.

8. The method of claim 1 wherein the radial basis function further comprises a normalized Gaussian function.

9. The method of claim 1 wherein the at least one NMR measurement further comprises at least one of: (i) a spin echo amplitude and (ii) an amplitude of a distribution of a transverse relaxation time $T_2$ derived from the spin-echo signals.

10. The method of claim 1 further comprising: conducting additional operations using the estimated value of the property.

11. An apparatus configured to estimate a value of a property of an earth formation, the apparatus comprising:
a nuclear magnetic resonance (NMR) sensor assembly configured to be conveyed in a borehole in the earth formation and obtain nuclear magnetic resonance (NMR) spin-echo signals indicative of the property of the earth formation; and
a processor configured to:
derive a radial basis function to estimate the value using an estimate for a pore modality of the earth formation and at least one of: (i) a database comprising a plurality of samples and (ii) an NMR measurement associated with each sample in the database and related to the NMR spin-echo signals; and
estimate the value using the NMR spin-echo signals and the radial basis function.

12. The apparatus of claim 11 wherein the radial basis function used by the processor is derived using a classification of the earth formation into at least one of: (i) a siliciclastic formation, (ii) carbonate based on a Dunham classification scheme, (iii) a carbonate based on a Lucia classification scheme, and (iv) a carbonate based on a Melim classification scheme.

13. The apparatus of claim 11 wherein the radial basis function used by the processor is derived using a classification based on the number of modes of a transverse relaxation time ($T_2$) distribution derived from the spin-echo signals.

14. The apparatus of claim 10 wherein the property of which the values is estimated by the processor is selected from: (i) a formation capillary pressure, (ii) a formation permeability, (iii) a formation resistivity factor, and (iv) a parameter of Archie's equation.

15. The apparatus of claim 14 wherein the processor is further configured to estimate at least three parameters characterizing a hyperbolic fitting function of the formation capillary pressure in mercury injection capillary pressure data.

16. The apparatus of claim 11 wherein the radial basis function used by the processor further comprises a normalized Gaussian function.

17. The apparatus of claim 11 wherein the at least one NMR measurement used by the processor further comprises at least one of: (i) a spin echo amplitude, and (ii) an amplitude of a distribution of a transverse relaxation time $T_2$ derived from the spin-echo signals.

18. The apparatus of claim 11 wherein the processor is further configured to perform additional operations using the estimated value of the property.

19. The apparatus of claim 11 further comprising a conveyance device configured to convey the NMR sensor assembly into the borehole, the conveyance device selected from: (i) a wireline, and (ii) a bottomhole assembly on a drilling tubular.

20. A non-transitory computer-readable medium product having thereon instructions that when read by a processor cause the processor to execute a method of estimating value of a property of interest of an earth formation, the method comprising:
deriving a radial basis function to estimate the value using an estimate for a pore modality of the earth formation and at least one of: (i) a database comprising a plurality of samples and (ii) an NMR measurement associated with each sample in the database and related to nuclear magnetic resonance (NMR) spin-echo signals; and
estimating the value using the NMR spin-echo signals and the radial basis function, the spin-echo signals being acquired using a NMR sensor assembly in a borehole penetrating the earth formation.

21. The non-transitory computer-readable medium product of claim 20 further comprising at least one of: (i) a ROM, (ii) an EPROM, (iii) an EAROM, (iv) a flash memory, and (v) an optical disk.

* * * * *